(12) United States Patent
Kim et al.

(10) Patent No.: US 9,108,523 B2
(45) Date of Patent: Aug. 18, 2015

(54) COMMUNICATION APPARATUS AND COMMUNICATION METHOD IN WIRELESS POWER TRANSMISSION SYSTEM

(75) Inventors: Nam Yun Kim, Seoul (KR); Sang Wook Kwon, Seongnam-si (KR); Eun Seok Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 13/567,264

(22) Filed: Aug. 6, 2012

(65) Prior Publication Data

US 2013/0035126 A1  Feb. 7, 2013

(30) Foreign Application Priority Data

Aug. 5, 2011  (KR) .................. 10-2011-0078004

(51) Int. Cl.
| | |
|---|---|
| H04W 72/04 | (2009.01) |
| B60L 11/18 | (2006.01) |
| H02J 5/00 | (2006.01) |
| H04B 5/00 | (2006.01) |
| H02J 7/02 | (2006.01) |

(52) U.S. Cl.
CPC ........... *B60L 11/182* (2013.01); *B60L 11/1833* (2013.01); *B60L 11/1846* (2013.01); *H02J 5/005* (2013.01); *B60L 2210/30* (2013.01); *B60L 2210/40* (2013.01); *H02J 7/025* (2013.01); *H04B 5/0037* (2013.01); *H04B 5/0081* (2013.01); *Y02T 10/7005* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .. H03B 5/1852; H04B 10/071; H04N 17/004; H04N 7/17309
See application file for complete search history.

(56) References Cited

U.S. PATENT DOCUMENTS

| | | | | |
|---|---|---|---|---|
| 8,933,589 | B2 * | 1/2015 | Bourilkov et al. | 307/104 |
| 8,994,222 | B2 * | 3/2015 | Ryu et al. | 307/104 |
| 2007/0264937 | A1 * | 11/2007 | Han et al. | 455/63.3 |
| 2010/0034238 | A1 | 2/2010 | Bennett | |
| 2010/0036773 | A1 | 2/2010 | Bennett | |
| 2011/0127843 | A1 | 6/2011 | Karaoguz et al. | |
| 2011/0169338 | A1 | 7/2011 | Kozakai | |
| 2013/0035034 | A1 * | 2/2013 | Kim et al. | 455/41.1 |
| 2013/0237272 | A1 * | 9/2013 | Prasad | 455/517 |

FOREIGN PATENT DOCUMENTS

KR   10-2007-0109497 A   11/2007

* cited by examiner

*Primary Examiner* — Bobbak Safaipour
(74) *Attorney, Agent, or Firm* — NSIP Law

(57) ABSTRACT

A communication apparatus in a wireless power transmission system includes an operating mode converter configured to switch an operating mode of the communication apparatus between a transmitting mode and a receiving mode according to a predetermined timing; and a transmitting unit configured to transmit state information of a channel occupied by a source including the communication apparatus using a continuous wave signal while the communication apparatus is operating in the transmitting mode irrespective of whether the communication apparatus is performing communication via the occupied channel. The source including the communication apparatus is configured to transmit wireless power. The occupied channel has been assigned to the source including the communication apparatus from a plurality of channels available in a communication cell for assignment to a plurality of sources each configured to transmit wireless power.

12 Claims, 16 Drawing Sheets

→ Input Current
--→ Induced Current

COMMUNICATION APPARATUS AND COMMUNICATION METHOD IN WIRELESS POWER TRANSMISSION SYSTEM

CROSS-REFERENCE TO RELATED APPLICATIONS

This application claims the benefit under 35 USC 119(a) of Korean Patent Application No. 10-2011-0078004 filed on Aug. 5, 2011, in the Korean Intellectual Property Office, the entire disclosure of which is incorporated herein by reference for all purposes.

BACKGROUND

1. Field

The following description relates to an apparatus and a method for performing communication in a wireless power transmission system.

2. Description of Related Art

Research on wireless power transmission has been started to overcome the inconveniences of wired power supplies, or the limited capacity of conventional batteries, due to a rapid increase in various electronic devices including electric vehicles, mobile devices, and other devices intended to be used without being connected to a wired power supply. One type of wireless power transmission technology uses resonance characteristics of radio frequency (RF) devices. For example, a wireless power transmission system using resonance characteristics includes a source configured to supply power, and a target configured to receive the power supplied by the source.

SUMMARY

In one general aspect, a communication apparatus in a wireless power transmission system includes an operating mode converter configured to switch an operating mode of the communication apparatus between a transmitting mode and a receiving mode according to a predetermined timing; and a transmitting unit configured to transmit state information of a channel occupied by a source including the communication apparatus using a continuous wave signal while the communication apparatus is operating in the transmitting mode irrespective of whether the communication apparatus is performing communication via the occupied channel, the source including the communication apparatus being configured to transmit wireless power, the occupied channel having been assigned to the source including the communication apparatus from a plurality of channels available in a communication cell for assignment to a plurality of sources each configured to transmit wireless power.

The communication apparatus may further include a receiving unit configured to receive a channel assignment request message from an additional source in the communication cell while the communication apparatus is operating in the receiving mode, the additional source having entered the communication cell after all of the channels have already been assigned to other sources.

The communication apparatus may further include a determining unit configured to determine whether the occupied channel is to be assigned to the additional source based on the state information of the occupied channel and a schedule of the source including the communication apparatus for using the occupied channel in response to the channel assignment request message.

The transmitting unit may be further configured to transmit a channel assignment approval message to the additional source in the transmitting mode when the determining unit determines that the occupied channel is to be assigned to the additional source.

The communication apparatus may further include a measuring unit configured to measure a received signal strength indicator (RSSI) and a link quality indicator (LQI) of the occupied channel while the communication apparatus is operating in the receiving mode.

The determining unit may be further configured to determine whether the occupied channel is to be changed to another channel based on the RSSI and the LQI of the occupied channel.

The receiving unit may be further configured to receive a channel assignment request message from any of the plurality of sources in the communication cell excluding the source including the communication apparatus while the communication apparatus is operating in the receiving mode.

The state information of the occupied channel may include information about the source including the communication apparatus that is currently occupying the channel, information about a target receiving wireless power from the source including the communication apparatus, and information about a schedule the source including the communication apparatus for using the channel.

In another general aspect, a communication apparatus in a wireless power transmission system includes a state information detecting unit configured to detect state information of a plurality of channels available in a communication cell that have been assigned to a plurality of sources each configured to transmit wireless power; an identifying unit configured to identify sources that are operating in a transmitting mode among the plurality of sources based on the state information; a determining unit configured to determine a channel for which a channel assignment is to be requested based on the state information and the sources identified by the identifying unit, the determined channel being one of the plurality of channels; and a transmitting unit configured to transmit a channel assignment request message to the source to which the determined channel is assigned while the source to which the determined channel is assigned is operating in a receiving mode.

The state information detecting unit may be further configured to detect a received signal strength indicator (RSSI) and a link quality indicator (LQI) of each of the plurality of channels as at least part of the state information.

The determining unit may be further configured to determine the channel for which a channel assignment is to be requested based on the RSSI and the LQI.

The identifying unit may be further configured to identify ones of the plurality of sources from which a continuous wave signal is received as the sources that are operating in the transmitting mode.

The transmitting unit may be further configured to wait until the source to which the determined channel is assigned is operating in the receiving mode to transmit the channel assignment request message to the source to which the source to which the determined channel is assigned when the source to which the determined channel is operating in the transmitting mode at a time the channel for which a channel assignment is to be requested is determined.

The communication apparatus may further include a receiving unit configured to receive a channel assignment approval message or a channel assignment disapproval message from the source to which the determined channel is assigned in response to the channel assignment request message transmitted to the source to which the determined channel is assigned.

In another general aspect, a communication method in a wireless power transmission system includes switching an operating mode of a communication apparatus performing the communication method between a transmitting mode and a receiving mode according to a predetermined timing; and transmitting state information of a channel occupied by a source including the communication apparatus using a continuous wave signal while the communication apparatus is operating in the transmitting mode irrespective of whether the communication apparatus is performing communication via the occupied channel, the source including the communication apparatus being configured to transmit wireless power, the occupied channel having been assigned to the source including the communication apparatus from a plurality of channels available in a communication cell for assignment to a plurality of sources each configured to transmit wireless power.

The communication method may further include receiving a channel assignment request message from an additional source in the communication cell while the communication apparatus is operating in the receiving mode, the additional source having entered the communication cell after all of the channels have already been assigned to other sources.

The communication method may further include determining whether the occupied channel is to be assigned to the additional source based on the state information of the occupied channel and a schedule of the source including the communication apparatus for using the occupied channel in response to the channel assignment request message.

The communication method may further include transmitting a channel assignment approval message to the additional source in the transmitting mode when a result of the determining is that the occupied channel is to be assigned to the additional source.

In another general aspect, a communication method in a wireless power transmission system includes detecting state information of a plurality of channels available in a communication cell that have been assigned to a plurality of sources each configured to transmit wireless power; identifying sources that are operating in a transmitting mode among the plurality of sources based on the state information; determining a channel for which a channel assignment is to be requested based on the state information and the sources identified by the identifying, the determined channel being one of the plurality of channels; and transmitting a channel assignment request message to the source to which the determined channel is assigned while the source to which the determined channel is assigned is operating in a receiving mode.

The detecting may include detecting a received signal strength indicator (RSSI) and a link quality indicator (LQI) of each of the plurality of channels as at least part of the state information.

The determining may include determining the channel for which a channel assignment is to be requested based on the RSSI and the LQI.

The communication method may further include receiving a channel assignment approval message or a channel assignment disapproval message from the source to which the determined channel is assigned in response to the channel assignment request message transmitted to the source to which the determined channel is assigned.

The communication method of claim 22, may further include communicating with a target in a power cell configured to receive wireless power via the determined channel after the channel assignment approval message is received; and transmitting a channel use termination message indicating that use of the determined channel has been terminated to the source to which the determined channel was assigned after the communicating with the target is terminated.

Other features and aspects will be apparent from the following detailed description, the drawings, and the claims.

DETAILED DESCRIPTION

Figure 1:
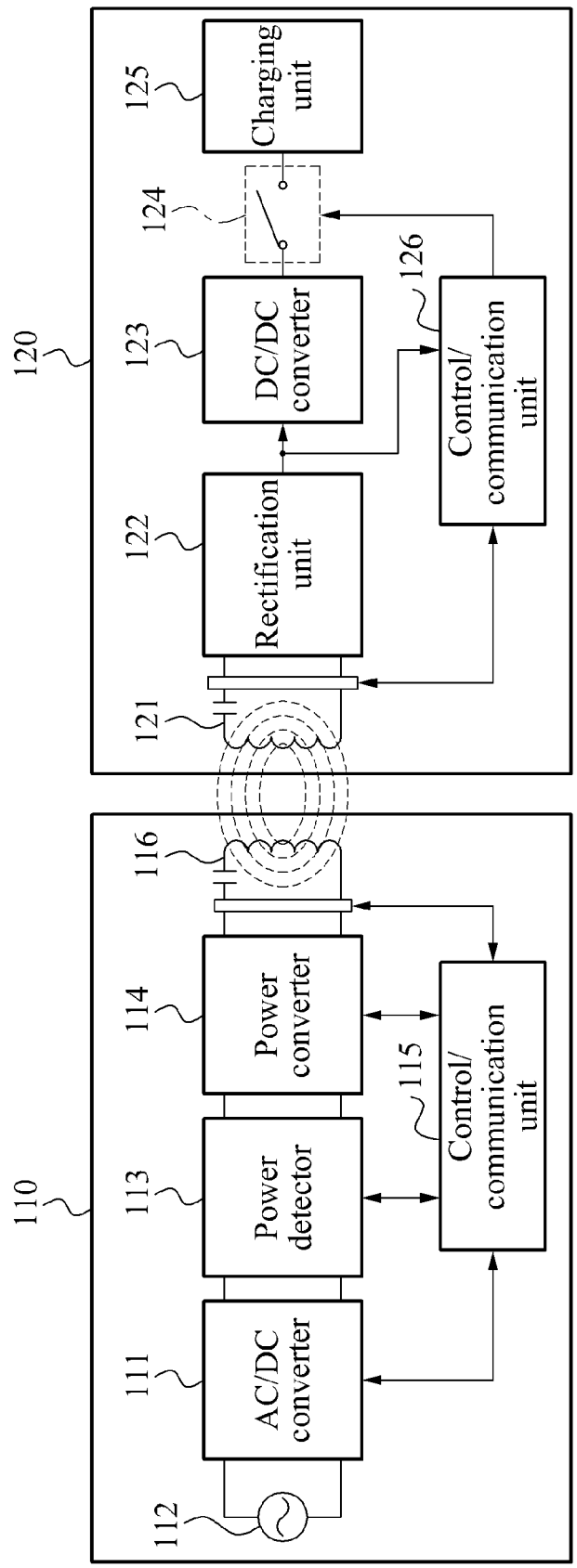
FIG. 1 is a diagram illustrating an example of a wireless power transmission and charging system.

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The sequences of operations described herein are merely examples, and the sequences of operations are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same drawing reference numerals refer to the same elements. The drawings may not be to scale, and relative size, proportions, and depictions elements in the drawings may be exaggerated for clarity, illustration, and convenience.

A scheme of performing communication between a source device and a target device may include an in-band communication scheme, or an out-of-band communication scheme, or both. The in-band communication scheme refers to communication performed between the source device and the target device in the same frequency band that is used for power transmission. The out-of-band communication scheme refers to communication performed between the source device and the target device in a different frequency band than a frequency band used for power transmission.

When a plurality of source devices are densely positioned, communication between the source device and the target device may be difficult due to communication errors and signal interference from other devices. A communication apparatus in a wireless power transmission system may determine an optimal channel without interference by obtaining information about a channel already occupied by another source device in a process of assigning, to a source device, a channel to be used to perform communication.

FIG. 1 is a diagram illustrating an example of a wireless power transmission and charging system. Referring to FIG. 1, the wireless power transmission and charging system includes a source device 110 and a target device 120. The source device 110 is a device supplying wireless power, and may be any of various electric devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a charging unit 125, and a control/communication unit 126.

The AC/DC converter 111 generates a DC voltage by rectifying an AC voltage having a frequency of tens of hertz (Hz) output from a power supply 112. The AC/DC converter 111 may output a DC voltage having a predetermined level, or output a DC voltage having an adjustable level that is controlled by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonant frequency $F_{Ref}$, and generates a communication power to be used for communication or a charging power to be used for charging that may be used in a plurality of target devices. The communication power may be, for example, a low power of 0.1 to 1 milliwatts (mW), and the charging power may be, for example, a high power of 1 mW to 200 Watts (W) that may be consumed by a device load of a target device. In this description, the term "charging" may refer to supplying power to an element or a unit that may charges a battery or other rechargeable device with power. Also, the term "charging" may refer to supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonant frequency" refers to a resonant frequency that is nominally used by the source device 110, and the term "tracking frequency" refers to a resonant frequency used by the source device 110 that has been adjusted based on a predetermined scheme.

The control/communication unit 115 may detect a reflected wave of the communication power or a reflected wave of the charging power, and may detect mismatching between the target resonator 121 and the source resonator 116 based on the detected reflected wave. The control/communication unit 115 may detect the mismatching by detecting an envelope of the reflected wave, or by detecting an amount of a power of the reflected wave. The control/communication unit 115 may calculate a voltage standing wave ratio (VSWR) based on a voltage level of the reflected wave and a level of an output voltage of the source resonator 116 or the power converter 114. When the VSWR is greater than a predetermined value, the control/communication unit 115 detects that there is mismatching between the target resonator 121 and the source resonator 116. In this example, the control/communication unit 115 calculates a power transmission efficiency of each of N predetermined tracking frequencies, determines a tracking frequency $F_{Best}$ having the best power transmission efficiency among the N predetermined tracking frequencies, and changes the reference resonant frequency $F_{Ref}$ to the tracking frequency $F_{Best}$.

Also, the control/communication unit 115 may control a frequency of the switching pulse signal used by the power converter 114. By controlling the switching pulse signal used by the power converter 114, the control/communication unit 115 may generate a modulation signal to be transmitted to the target device 120. In other words, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication using various schemes. To generate a modulation signal, the control/communication unit 115 may turn on or off the switching pulse signal used by the power converter 114, or may perform delta-sigma modulation. Additionally, the control/communication unit 115 may generate a pulse-width modulation (PWM) signal having a predetermined envelope.

The control/communication unit 115 may perform out-of-band communication using a communication channel. The control/communication unit 115 may include a communication module, such as a ZigBee module, a Bluetooth module, or any other communication module known to one of ordinary skill in the art, that the control/communication unit 115 may use to perform the out-of-band communication. The control/communication unit 115 may transmit or receive data to or from the target device 120 via the out-of-band communication.

The source resonator 116 transfers electromagnetic energy, such as the communication power or the charging power, to the target resonator 121 via a magnetic coupling with the target resonator 121.

The target resonator 121 receives the electromagnetic energy, such as the communication power or the charging power, from the source resonator 116 via a magnetic coupling with the source resonator 116. Additionally, the target resonator 121 may receive various messages from the source device 110 via the in-band communication.

The rectification unit 122 generates a DC voltage by rectifying an AC voltage received by the target resonator 121.

The DC/DC converter 123 adjusts a level of the DC voltage output from the rectification unit 122 based on a voltage rating of the charging unit 125. For example, the DC/DC converter 123 may adjust the level of the DC voltage output from the rectification unit 122 to a level in a range from 3 volts (V) to 10 V.

The switch unit 124 is turned on and off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The charging unit 125 may include a battery. The charging unit 125 may charge the battery using the DC voltage output from the DC/DC converter 123.

The control/communication unit 126 may perform in-band communication for transmitting or receiving data using a resonant frequency by demodulating a received signal obtained by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121 to modulate a signal to be transmitted to the source device 110. Specifically, the control/communication unit 126 may modulate the signal to be transmitted to the source device 110 by turning on or off the switch unit 124. For example, the control/communication unit 126 may increase the impedance of the target resonator 121 by turning the switch unit 124 off so that a reflected wave will be detected by the control/communication unit 115 of the source device 110. In this example, depending on whether the reflected wave is detected, the control/communication unit 115 of the source device 110 will detect a binary number "0" or "1."

The control/communication unit 126 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used by the corresponding target device, an amount of power to be used by the corresponding target device, an intrinsic identifier of the corresponding target device, product version information of the corresponding target device, and standards information of the corresponding target device.

The control/communication unit 126 may also perform an out-of-band communication using a communication channel. The control/communication unit 126 may include a communication module, such as a ZigBee module, a Bluetooth module, or any other communication module known to one of ordinary skill in the art, that the control/communication unit 126 may use to transmit or receive data to or from the source device 110 via the out-of-band communication.

The control/communication unit 126 may receive a wake-up request message from the source device 110, detect an amount of a power received by the target resonator 121, and transmit, to the source device 110, information about the amount of the power received by the target resonator 121. In this example, the information about the amount of the power received by the target resonator 121 may correspond to an input voltage value and an input current value of the rectification unit 122, an output voltage value and an output current value of the rectification unit 122, or an output voltage value and an output current value of the DC/DC converter 123.

The control/communication unit 115 may set a resonance bandwidth of the source resonator 116. Based on the set resonance bandwidth of the source resonator 116, a Q-factor $Q_S$ of the source resonator 116 may be determined.

The control/communication unit 126 may set a resonance bandwidth of the target resonator 116. Based on the set resonance bandwidth of the target resonator 116, a Q-factor $Q_D$ of the target resonator 121 may be determined. In this example, the resonance bandwidth of the source resonator 116 may be set to be wider or narrower than the resonance bandwidth of the target resonator 121. By communicating with each other, the source device 110 and the target device 120 may share information regarding the resonance bandwidths of the source resonator 116 and the target resonator 121. When a power higher than a reference value is requested by the target device 120, the Q-factor $Q_S$ of the source resonator 116 may be set to a value greater than 100. When a power lower than the reference value is requested by the target device 120, the Q-factor $Q_S$ of the source resonator 116 may be set to a value less than 100.

In a resonance-based wireless power transmission, a resonance bandwidth is a significant factor. Let Qt denote a Q-factor of energy coupling between the source resonator 116 and the target resonator 121. The value of Qt is affected by a change in a distance between the source resonator 116 and the target resonator 121, a change in a resonance impedance, impedance-mismatching, a reflected signal, or any other factor affecting a Q-factor. Qt is inversely proportional to a resonance bandwidth as expressed by the following Equation 1:

$$\frac{\Delta f}{f_0} = \frac{1}{Qt} \qquad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between resonators, $BW_S$ denotes a resonance bandwidth of the source resonator 116, and $BW_D$ denotes a resonance bandwidth of the target resonator 121.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad (2)$$

In Equation 2, $\kappa$ denotes a coupling coefficient of energy coupling between the source resonator 116 and the target resonator 121, $\Gamma_S$ denotes a reflection coefficient of the source resonator 116, $\Gamma_D$ denotes a reflection coefficient of the target resonator 121, $\omega_0$ denotes a resonant frequency, M denotes a mutual inductance between the source resonator 116 and the target resonator 121, $R_S$ denotes an impedance of the source resonator 116, $R_D$ denotes an impedance of the target resonator 121, $Q_S$ denotes a Q-factor of the source resonator 116, $Q_D$ denotes a Q-factor of the target resonator 121, and $Q_\kappa$ denotes a Q-factor of energy coupling between the source resonator 116 and the target resonator 121, and is the same as Qt discussed above in connection with Equation 1.

As can be seen from Equation 2, the Q-factor has a great effect on an efficiency of the wireless power transmission. Accordingly, the Q-factor may be set to a high value to increase the efficiency of the wireless power transmission. However, even when $Q_S$ and $Q_D$ are set to high values, the efficiency of the wireless power transmission may be reduced by a change in the coupling coefficient κ of the energy coupling, a change in a distance between the source resonator 116 and the target resonator 121, a change in a resonance impedance, impedance mismatching, and any other fact affecting the efficiency of the wireless power transmission.

If the resonance bandwidths $BW_S$ and $BW_D$ of the source resonator 116 and the target resonator 121 are set to be too narrow to increase the efficiency of the wireless power transmission, impedance mismatching and other undesirable conditions may easily occur due to insignificant external influences. In order to account for the effect of impedance mismatching, Equation 1 may be rewritten as the following Equation 3:

$$\frac{\Delta_f}{f_0} = \frac{\sqrt{VSWR} - 1}{Qt\sqrt{VSWR}} \quad (3)$$

In an example in which an unbalanced relationship of a resonance bandwidth or a bandwidth of an impedance matching frequency between the source resonator 116 and the target resonator 121 is maintained, a reduction in an efficiency of the wireless power transmission may be prevented due to a change in the coupling coefficient κ, a change in the distance between the source resonator 116 and the target resonator 121, a change in the resonance impedance, impedance mismatching, and any other factor affecting the efficiency of the wireless power transmission.

According to Equation 1 through Equation 3, when the resonance bandwidth between the source resonator 116 and the target resonator 121 or the bandwidth of an impedance-matching frequency remains unbalanced, the Q-factor of the source resonator 116 and the Q-factor of the target resonator 121 may remain unbalanced.

Figure 2A:
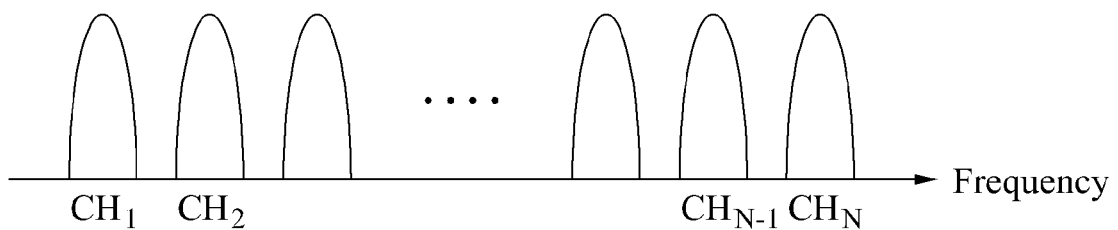
FIGS. 2A and 2B are diagrams illustrating an example of a process of assigning channels to a plurality of sources in a wireless power transmission system.
Figure 2B:
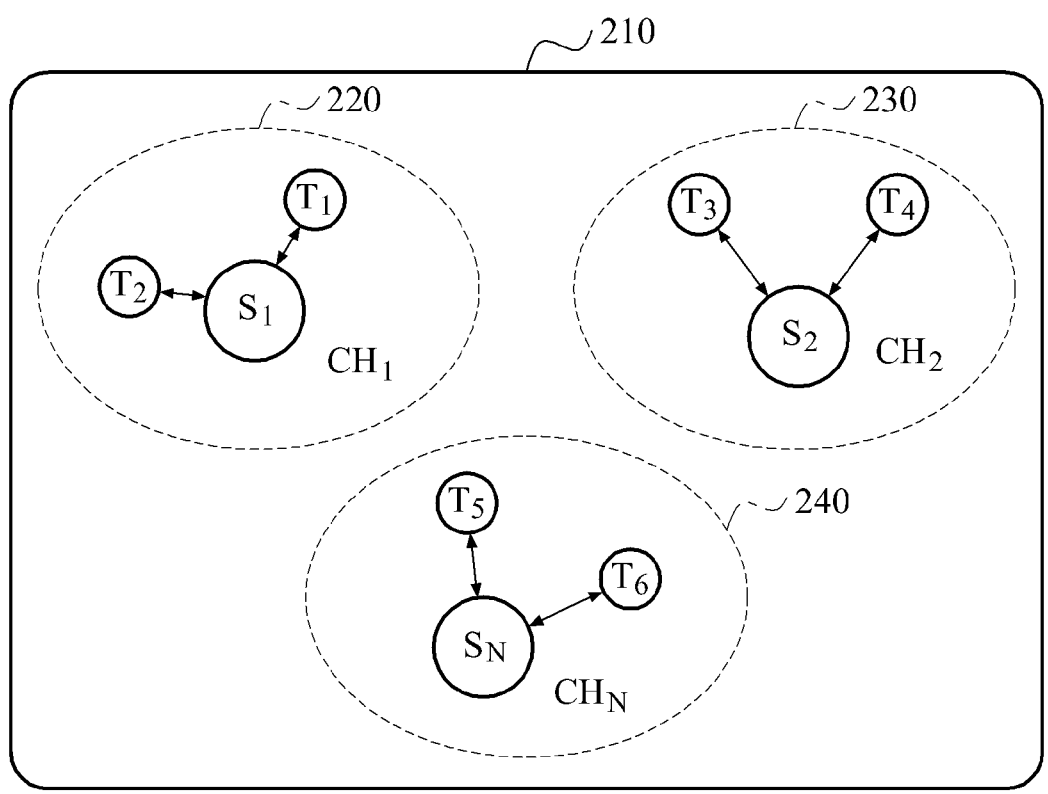

FIGS. 2A and 2B are diagrams illustrating an example of a process of assigning channels to a plurality of sources in a wireless power transmission system. In this description, the term "source" refers to a source device, and the term "target" refers to a target device. Referring to FIGS. 2A and 2B, when a plurality of sources are positioned in a single communication cell 210, a plurality of channels available in the communication cell 210 may be respectively assigned to the plurality of sources for the plurality of sources to use in performing communication. In this example, it will be assumed that N channels are available in the communication cell 210 as shown in FIG. 2A.

When a source $S_1$ enters the communication cell 210, the source $S_1$ determines states of the N channels, and assigns a channel in a best state among the N channels to the source $S_1$. In this example, state of a channel is determined based on a Received Signal Strength Indicator (RSSI) and a Link Quality Indicator (LQI) of the channel. Assuming that a channel $CH_1$ is in a best state, the source $S_1$ assigns the channel $CH_1$ to the source $S_1$. Then, when a source $S_2$ enters the communication cell 210, the source $S_2$ assigns a channel $CH_2$ in a best state among the remaining N−1 channels excluding the channel $CH_1$ to the source $S_2$. When a source $S_N$ enters the communication cell 210 after channels $CH_1$ to $CH_{N-1}$ have been assigned to sources $S_1$ to $S_{N-1}$ (not shown in FIG. 2B) that sequentially entered the communication cell 210, the source $S_N$ assigns a last remaining channel $CH_N$ to the source $S_N$. By using this scheme, when N sources enter the communication cell 210, the N sources assign the N channels to the N sources so that a different one of the N channels is assigned to each of the N sources.

The sources to which the channels are assigned perform communication with targets via the assigned channels in respective power cells of the sources. For example, as shown in FIG. 2B, the source $S_1$ performs communication with targets $T_1$ and $T_2$ via the channel $CH_1$ assigned to the source $S_1$ in a power cell 220 of the source $S_1$. The source $S_2$ performs communication with targets $T_3$ and $T_4$ via the channel $CH_2$ assigned to the source $S_2$ in a power cell 230 of the source $S_2$. The source $S_N$ performs communication with targets $T_5$ and $T_6$ via the channel $CH_N$ assigned to the source $S_N$ in a power cell 240 of the source $S_N$.

However, when an additional source enters the communication cell 210 after all of the N channels have already been assigned to the N sources positioned in the communication cell 210, the additional source must assign one of the N channels to the additional source to enable the additional source to perform communication.

Figure 3:
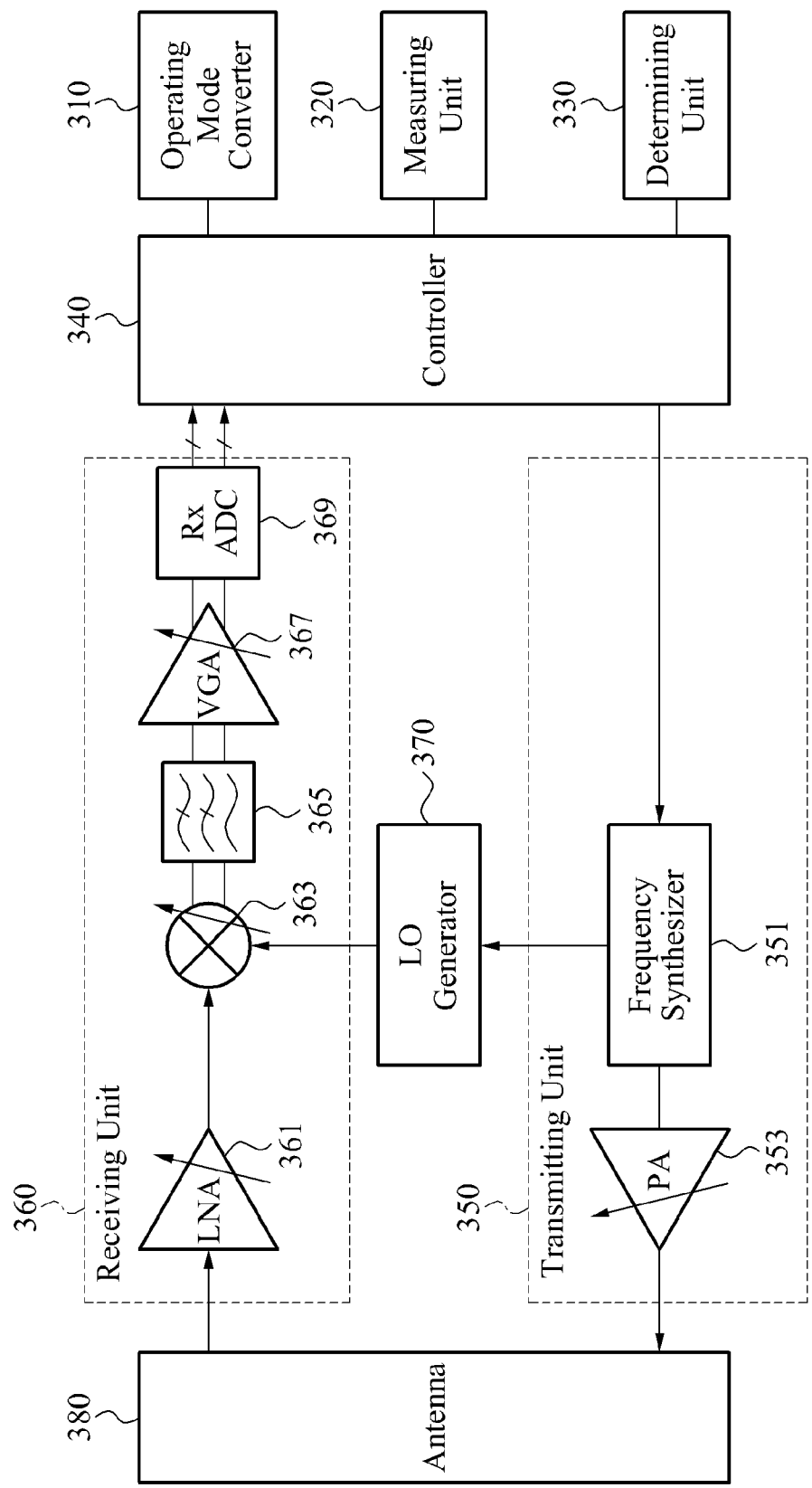
FIG. 3 is a diagram illustrating an example of a communication apparatus in a wireless power transmission system.

FIG. 3 is a diagram illustrating an example of a communication apparatus in a wireless power transmission system. Referring to FIG. 3, the communication apparatus includes an operating mode converter 310, a measuring unit 320, a determining unit 330, a controller 340, a transmitting unit 350, and a receiving unit 360. The communication apparatus of FIG. 3 may be a source to which a channel has already been assigned in a communication cell.

The operating mode converter 310 switches an operating mode of the communication apparatus between a transmitting mode and a receiving mode according to predetermined settings or settings set by a user, or according to a predetermined timing. The communication apparatus performs communication with a target in a power cell of the communication apparatus in the transmitting mode via an assigned channel. The power cell is an area in which the communication apparatus can transmit a power wirelessly. Also, the communication apparatus constantly transmits information indicating that the assigned channel is occupied using a continuous wave signal in the transmitting mode. The communication apparatus receives information from the target in the power cell of the communication apparatus in the receiving mode. Also, the communication apparatus receives messages to request a channel assignment from neighboring sources in the receiving mode. Also, the communication apparatus measures state information of a channel based on interference signals from the neighboring sources, other changes in a peripheral environment, and other factors affecting the state of the channel.

The measuring unit 320 measures a state of the occupied channel, i.e., the channel assigned to the communication apparatus, while the communication apparatus is operating in the receiving mode. For example, the measuring unit 320 may measure a received signal strength indicator (RSSI) and a link quality indicator (LQI) of a channel. The RSSI indicates a strength of a wireless signal affected by communication devices of types identical to or different from a type of the source, i.e., the communication apparatus. The LQI indicates a quality of a communication state of the occupied channel. The RSSI and the LQI and how to measure them are well known to one of ordinary skill in the art, and thus will not be described in detail here for conciseness.

The transmitting unit 350 transmits a signal indicating that the assigned channel is occupied irrespective of whether the communication apparatus is performing communication with a target while the communication apparatus is operating in the transmitting mode. Also, the transmitting unit 350 transmits state information of the occupied channel. The transmitting unit 350 may inform neighboring sources that the assigned channel is occupied by transmitting a continuous wave signal in the transmitting mode. In this example, the continuous wave signal may be a signal modulated to have a constant amplitude. The state information of the occupied channel may include information about a source, i.e., the communication apparatus, currently occupying the channel, information about a target receiving a power from the source, and information about a schedule of the source using the channel. For example, the information about the source currently occupying the channel may include an identification (ID) of the source, an ID number of the channel occupied by the source, and any other information about the source and the channel.

The transmitting unit 350 includes a frequency synthesizer 351 and a power amplifier (PA) 353. The frequency synthesizer 351 synthesizes a frequency to be used for communication. The frequency synthesizer 351 may synthesize the frequency to be used for communication using an oscillator (not shown). The PA 353 amplifies a power of a signal generated by the frequency synthesizer 331 to reduce an effect of noise in a wireless frequency band. The amplified signal is transmitted via an antenna 380. When a frequency used for communication is changed, a local oscillator (LO) generator 370 provides a signal having the changed frequency to the receiving unit 360 based on information about the changed frequency that the LO generator 370 receives from the frequency synthesizer 331. The controller 340 may adjust a power of the PA 353.

The receiving unit 360 receives, from neighboring sources, a channel assignment request message while the communication apparatus is operating in a receiving mode. The neighboring sources may include an additional source entering the communication cell after all channels available in the communication cell have already been assigned. The additional source may measure state information of each channel in the communication cell, select an optimal channel based on a result of the measurement, and transmit a channel assignment request requesting assignment of the optimal channel. When the additional source receives a continuous wave signal via a channel indicating that the channel is occupied, the additional source may exclude the channel when selecting the optimal channel. Also, the neighboring sources may further include a source desiring to change a channel after a channel has already been assigned to the source in the communication cell.

The receiving unit 360 includes a low-noise amplifier (LNA) 361, a mixer 363, a low-pass filter (LPF) 365, a variable gain amplifier (VGA) 367, and a receiving analog-digital converter (Rx ADC) 369. The LNA 361 amplifies a signal received from the antenna 380. In this example, the LNA 361 is disposed close to the antenna 380 to reduce attenuation of a transmission line. Also, the LNA 361 reduces a noise included in the signal. The mixer 363 generates a signal in a new frequency band using two input signals. The mixer 363 generates the signal in the new frequency band by heterodyning the signal amplified by the LNA 361 with the signal provided from the LO generator 370. The mixer 363 lowers a frequency of the signal amplified by the LNA 361 from a wireless frequency band to a baseband. The LPF 365 passes signals with frequencies lower than a cutoff frequency, and passes signals with frequencies higher than the cutoff frequency. The VGA 367 amplifies the signal passing through the LPF 365. A gain of the VGA 367 is changed by a control voltage. The Rx ADC 369 converts an analog signal to a digital signal, and provides the digital signal to the controller 340. The controller 340 restores a message by decoding the digital signal. The controller 340 adjusts gains of the LNA 361, the mixer 363, and the VGA 367.

The determining unit 330 determines whether a channel occupied by the communication apparatus is to be assigned in response to the received channel assignment request message. The determining unit 330 determines whether the occupied channel is to be assigned based on a schedule for the communication apparatus using the occupied channel, and state information of the occupied channel. When the determining unit 330 determines that the occupied channel is to be assigned, the transmitting unit 350 transmits a channel assignment approval message. When the determining unit 330 determines that the occupied channel is not to be assigned, the transmitting unit 350 transmits a channel assignment disapproval message. Also, the determining unit 330 determines whether the occupied channel is to be changed based on the state information of the occupied channel measured by the measuring unit 320. In this example, the determining unit 330 determines whether the occupied channel is to be changed based on the RSSI of the occupied channel, or an LQI of the occupied channel, or both the RSSI and the LQI.

The controller 340 adjusts an amplitude of the continuous wave signal. That is, the controller 340 varies a level of the continuous wave signal so that the continuous wave signal is transmitted at a constant amplitude. By transmitting the continuous wave signal, the neighboring sources may be informed that the channel is being used by the communication apparatus. In this example, the amplitude of the continuous wave signal determines a distance within which information about the channel occupancy may be transmitted by the continuous wave signal. For example, the communication apparatus may transmit the information about the channel occupancy over a farther distance when the amplitude of the continuous wave signal is relatively larger, as compared to a case in which the amplitude of the continuous wave signal is relatively smaller. The controller 340 may adjust the amplitude of the continuous wave signal to reduce interference with a neighboring source based on a distance to the neighboring source.

The controller 340 controls an overall operation of the communication apparatus, and may perform functions of the operating mode converter 310, the measuring unit 320, the determining unit 330, the transmitting unit 350, and the receiving unit 360. To individually describe the functions of the operating mode converter 310, the measuring unit 320, the determining unit 330, the transmitting unit 350, and the receiving unit 360, the operating mode converter 310, the measuring unit 320, the determining unit 330, the transmitting unit 350, and the receiving unit 360 are separately illustrated in FIG. 3. However, when the communication apparatus of FIG. 3 is actually implemented, the controller 340 may be configured to perform all of the functions of the operating mode converter 310, the measuring unit 320, the determining unit 330, the transmitting unit 350, and the receiving unit 360, or only some of these functions.

Figure 4:
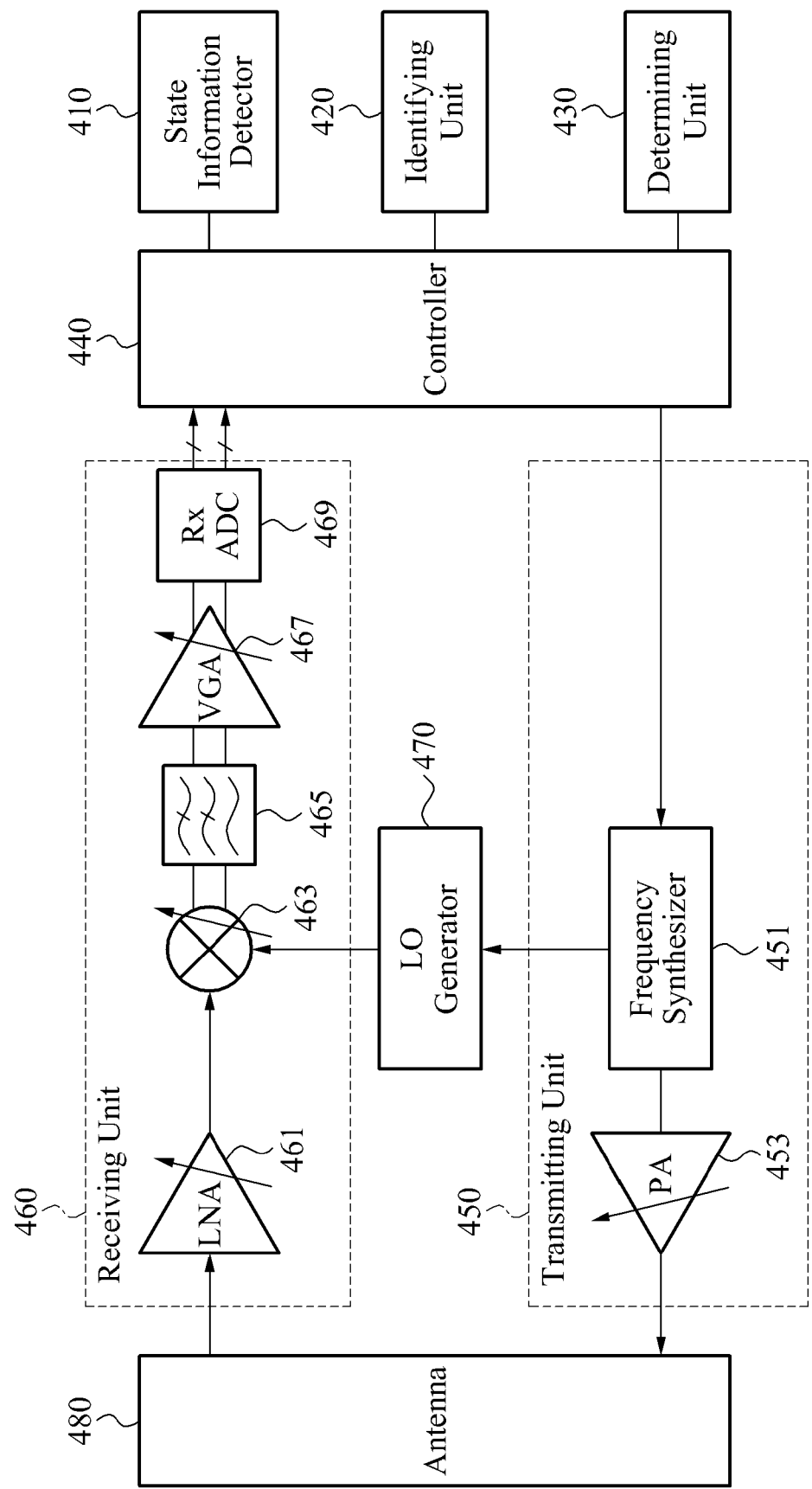
FIG. 4 is a diagram illustrating another example of a communication apparatus in a wireless power transmission system.

FIG. 4 is a diagram illustrating another example of a communication apparatus in a wireless power transmission system. Referring to FIG. 4, the communication apparatus includes a state information detector 410, an identifying unit 420, a determining unit 430, a controller 440, a transmitting unit 450, and a receiving unit 460. The communication apparatus of FIG. 4 may be an additional source entering a communication cell after all available channels have already been assigned to other sources in the communication cell.

The state information detector 410 detects state information of assigned channels in a communication cell. In this example, the state information detector 410 may detect an RSSI and an LQI of each of the channels as the state information.

The identifying unit 420 determines whether a source occupying a channel is operating in a transmitting mode based on the detected state information. The identifying unit 420 identifies sources operating in the transmitting mode among a plurality of sources to which channels have been assigned. In this example, the identifying unit 420 determines that a channel is occupied by a source when an RSSI of the channel detected by the state information detector 410 has a value greater than or equal to a predetermined level, or when an LQI of the channel detected by the state information detector 410 has a value less than or equal to a predetermined level, or both the RSSI and the LQI. That is, the identifying unit 420 determines whether the channel is occupied by the source based on the RSSI of the channel, or the LQI of the channel, or both the RSSI and the LQI. Also, the identifying unit 420 may determine that the channel is occupied by the source when a continuous wave signal is detected on the corresponding channel. When an additional source entering the communication cell is a different type of source than the existing sources, the additional source may obtain information about the occupied channel from the continuous wave signal without affect the occupied channel.

The determining unit 430 determines a channel for which a channel assignment is to be requested based on the detected state information. In this example, the determining unit 430 determines the channel for which a channel assignment is to be requested based on the RSSI of each channel, or the LQI of each channel, or both the RSSI and the LQI. For example, the determining unit 430 determines a channel that is not occupied by another source to be the channel for which a channel assignment is to be requested among channels having a relatively low RSSI and a relatively high LQI. The channel that is not occupied by another source is identified by the identifying unit 420. In the determining process, a channel occupied by another is excluded from a channel assignment request. Accordingly, interference occurring in the channel that is occupied by another source due to the channel assignment request is reduced. Also, stable communication may be performed between a target and the source occupying the channel via the occupied channel.

The transmitting unit 450 transmits a channel assignment request message to a source to which the channel determined by the determining unit 430 is already assigned so that the channel determined by the determining unit 430 may be assigned to the communication apparatus. In particular, the transmitting unit 450 transmits the channel assignment request message to a source operating in a receiving mode. Also, timings for the transmitting mode and the receiving mode may be set to be identical between identical types of sources positioned in the communication cell. Accordingly, the transmitting unit 450 may transmit the channel assignment request message, at a timing when the source to which the determined channel is already assigned is operating in the receiving mode. That is, when the channel for which a channel assignment is to be requested is determined, the transmitting unit 450 may operate in a standby mode until the timing when the source occupying the channel is operating in the receiving mode, and then the transmitting unit 450 may transmit the channel assignment request message while the source occupying the channel is operating in the receiving mode.

The transmitting unit 450 includes a frequency synthesizer 451 and a PA 453. The frequency synthesizer 451 synthesizes a frequency to be used for communication. The frequency synthesizer 451 may synthesize the frequency to be used for communication using an oscillator (not shown). The PA 453 amplifies a power of a signal generated by the frequency synthesizer to reduce an effect of noise in a wireless frequency band. The amplified signal is transmitted via an antenna 480. When a frequency used for communication is changed, an LO generator 470 provides a signal having the changed frequency to the receiving unit 460 based on information about the changed frequency that the LO generator 470 receives from the frequency synthesizer 451. The controller 440 may adjust a power of the PA 453.

The receiving unit 460 may receives a channel assignment approval message or a channel assignment disapproval message from the source to which the channel assignment request message was transmitted. The source to which the channel assignment request message was transmitted determines whether a channel assignment of the channel already assigned to the source to which the channel assignment request message was transmitted is to be approved based on a state of the source and a state of the channel in response to the received channel assignment request message. Depending on results of the determinations, the source to which the channel assignment request message was transmitted transmits the channel assignment approval message or the channel assignment disapproval message to the communication apparatus.

When the communication apparatus receives the channel assignment disapproval message, the communication apparatus detects state information of other channels, and requests a channel assignment from other sources that are not operating in the transmitting mode. Also, the communication apparatus may operate in a standby mode until a source occupying a channel in a best state is operating in the receiving mode, and may then request a channel assignment from the source occupying the channel in the best state while the source occupying the channel in the best state is operating in the receiving mode.

The receiving unit 460 includes an LNA 461, a mixer 463, an LPF 465, a VGA 467, and an Rx ADC 469. The LNA 461 amplifies a signal received from the antenna 480. In this example, the LNA 461 is disposed close to the antenna 480 to reduce attenuation of a transmission line. Also, the LNA 461 reduces a noise included in the signal. The mixer 463 generates a signal in a new frequency band using two input signals. The mixer 463 generates a signal in a new frequency band by heterodyning the signal amplified by the LNA 461 with the signal provided by the LO generator 470. The mixer 463 lowers a frequency of the signal amplified by the LNA 461 from a wireless frequency band to a baseband. The LPF 465 passes signals with frequencies lower than a cutoff frequency, and passes signals with frequencies higher than the cutoff frequency. The VGA 467 amplifies the signal passing through the LPF 465. A gain of the VGA 467 is changed by a control voltage. The Rx ADC 469 converts an analog signal output from the VGA 467 to a digital signal, and provides the digital signal to the controller 440. The controller 440 restores a message by decoding the digital signal. The controller 440 adjusts gains of the LNA 461, the mixer 463, and the VGA 467.

The controller 440 controls an overall operation of the communication apparatus, and may perform functions of the state information detector 410, the identifying unit 420, the determining unit 430, the transmitting unit 450, and the receiving unit 460. To individually describe the functions of the state information detector 410, the identifying unit 420, the determining unit 430, the transmitting unit 450, and the receiving unit 460, the state information detector 410, the identifying unit 420, the determining unit 430, the transmitting unit 450, and the receiving unit 460 are separately illustrated in FIG. 4. However, when the communication apparatus of FIG. 4 is actually implemented, the controller 440 may be configured to perform all of the functions of the state information detector 410, the identifying unit 420, the determining unit 430, the transmitting unit 450, and the receiving unit 460, or only some of these functions.

Figure 5:
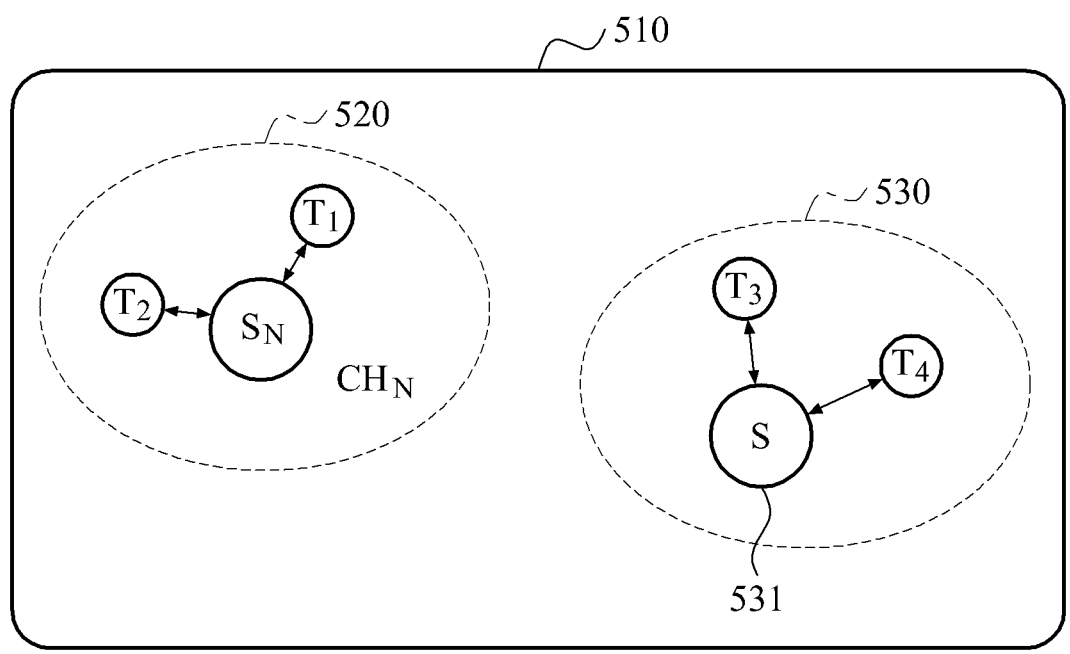
FIG. 5 is a diagram illustrating an example of a process of assigning a channel to an additional source entering a communication cell in a wireless power transmission system.

FIG. 5 is a diagram illustrating an example of a process of assigning a channel to an additional source entering a communication cell in a wireless power transmission system. Referring to FIG. 5, it will be assumed that channels have already been assigned to all of the sources in a communication cell 510, and a channel $CH_N$ has already been assigned to a source $S_N$. The source $S_N$ performs communication with a target $T_1$ and a target $T_2$ in a power cell 520 of the source $S_N$ via the channel $CH_N$. The communication cell 510 is an area in which communication is possible via a plurality of channels, and the power cell 520 is an area in which the source $S_N$ can transmit power wirelessly.

When an additional source S 531 enters the communication cell 510, a channel must be assigned to the source S 531 to enable the source S 531 to perform communication. In this example, the source $S_N$ operates in a transmitting mode to inform other sources in the communication cell 510 that the channel $CH_N$ is occupied by the source $S_N$. The source $S_N$ transmits a continuous wave signal on the channel $S_N$ in the transmitting mode, thereby informing other sources that the channel $CH_N$ is occupied by the source $S_N$. The source S 531 determines that the channel $CH_N$ is occupied by the source SN by detecting state information of the channel $CH_N$, or by detecting the continuous wave signal transmitted by the source $S_N$ on the channel $CH_N$. In this example, the source S 531 needs to request a channel assignment by searching for another channel other than the channel $CH_N$. The source S 531 measures state information of other channels excluding the channel $CH_N$, and requests a channel assignment for a channel occupied by a source that is not operating in the transmitting mode. After a channel has been assigned to the source S 531, the source S 531 may perform communication with a target $T_3$ and a target $T_4$ in a power cell 530 of the source S 531, and may transmit power wirelessly to the target $T_3$ and the target $T_4$.

The source $S_N$ may inform other sources in the communication cell 510 that the channel $CH_N$ is occupied by the source $S_N$ irrespective of whether the source $S_N$ is using the channel $CH_N$ to perform communication, thereby preventing an additional source entering the communication cell 510 or other sources in the communication cell 510 from using the channel $CH_N$.

Figure 6:
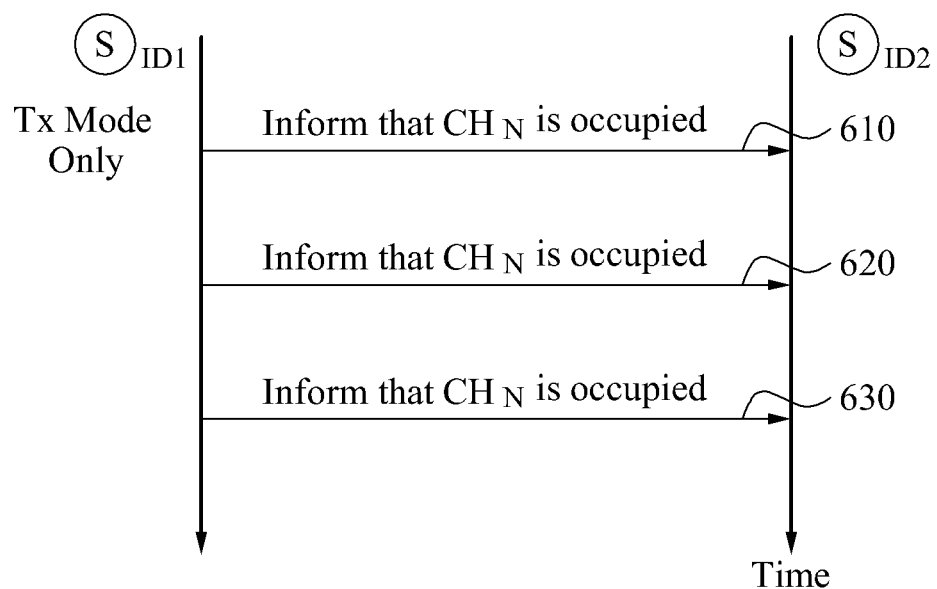
FIG. 6 is a diagram illustrating an example of an operation of a source occupying a channel in a wireless power transmission system.

FIG. 6 is a diagram illustrating an example of an operation of a source occupying a channel in a wireless power transmission system. Referring to FIG. 6, a source $S_{ID1}$ occupying a channel $CH_N$ transmits, to neighboring sources, information indicating that the channel $CH_N$ is occupied by the source $S_{ID1}$ via the channel $CH_N$ irrespective of whether the source $S_{ID1}$ is using the channel $CH_N$ to perform communication. The source $S_{ID1}$ constantly transmits the information indicating that the channel $CH_N$ is occupied by the source $S_{ID1}$ while the source $S_{ID1}$ is operating in a transmitting mode. In 610, the source $S_{ID1}$ transmits, to a source $S_{ID2}$ entering a communication cell, the information indicating that the channel $CH_N$ is occupied by the source $S_{ID1}$ using a continuous wave signal. In 620 and 630, the source $S_{ID1}$ also transmits, to the source $S_{ID2}$, the information indicating that the channel $CH_N$ is occupied by the source $S_{ID1}$ using the continuous wave signal. The source $S_{ID2}$ determines that the channel $CH_N$ is occupied by the source $S_{ID1}$ by detecting the continuous wave signal transmitted by the source SID1, and searched for other channels. Accordingly, interference by other sources in the channel $CH_N$ may be reduced.

Figure 7:
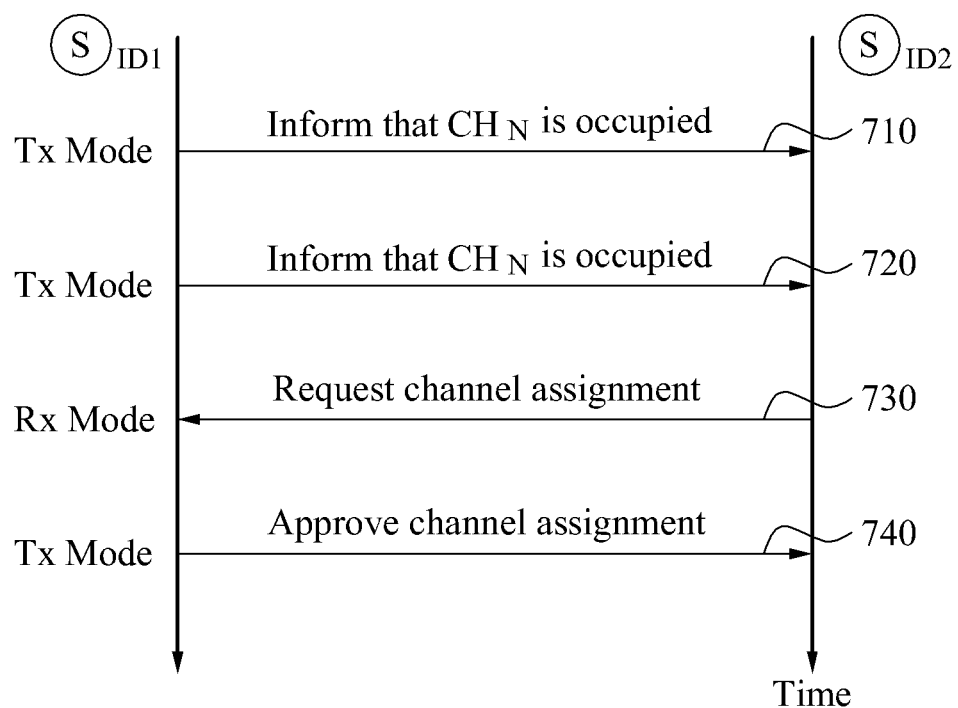
FIG. 7 is a diagram illustrating an example of an additional source requesting a channel assignment from a source occupying a channel in a wireless power transmission system.

FIG. 7 is a diagram illustrating an example of an additional source requesting a channel assignment from a source occupying a channel in a wireless power transmission system. Referring to FIG. 7, in 710 and 720, a source $S_{ID1}$ occupying a channel $CH_N$ informs a source $S_{ID2}$ that the channel $CH_N$ is occupied by the source $S_{ID1}$ using a continuous wave signal in a transmitting mode. The source $S_{ID1}$ then switches from the transmitting mode to a receiving mode according to predetermined settings or settings set by a user. In 730, the source $S_{ID1}$ receives channel assignment requests from neighboring sources while operating in the receiving mode. For example, as shown in FIG. 7, the source $S_{ID1}$ receives a channel assignment request message from the source $S_{ID2}$. The source $S_{ID2}$ may be an additional source entering a communication cell, or a source to which a channel has already been assigned in the communication cell. The source $S_{ID2}$ determines a channel to be assigned to the source $SI_{D2}$ based on RSSIs and LQIs of channels in the communication cell. In this example, the source $S_{ID2}$ may request a channel assignment from a source operating in the receiving mode in spite of a state of a the channel assigned to the source operating in the receiving mode being poor. Otherwise, the source $S_{ID2}$ may operate in a standby mode until a source occupying a channel in a best state begins operating in the receiving mode, and may then request a channel assignment from the source occupying the channel in the best state operating in the receiving mode. In 740, the source $S_{ID1}$ transmits a channel assignment approval message to the source $S_{ID2}$ in response to the received channel assignment request message. The source $S_{ID2}$ determines whether the source $S_{ID1}$ is operating in the receiving mode based on whether the source $S_{ID2}$ detects a continuous wave signal transmitted by the source $S_{ID1}$ on the channel occupied by the source $S_{ID1}$. When the source $S_{ID1}$ and the source $S_{ID2}$ are identical types of sources, the source $S_{ID1}$ and the source $S_{ID2}$ may operate in the transmitting mode or the receiving mode according to a predetermined timing. The source $S_{ID2}$ may request a channel assignment from the source $S_{ID1}$ during the predetermined timing when the source $S_{ID1}$ is operating in the receiving mode.

Figure 8:
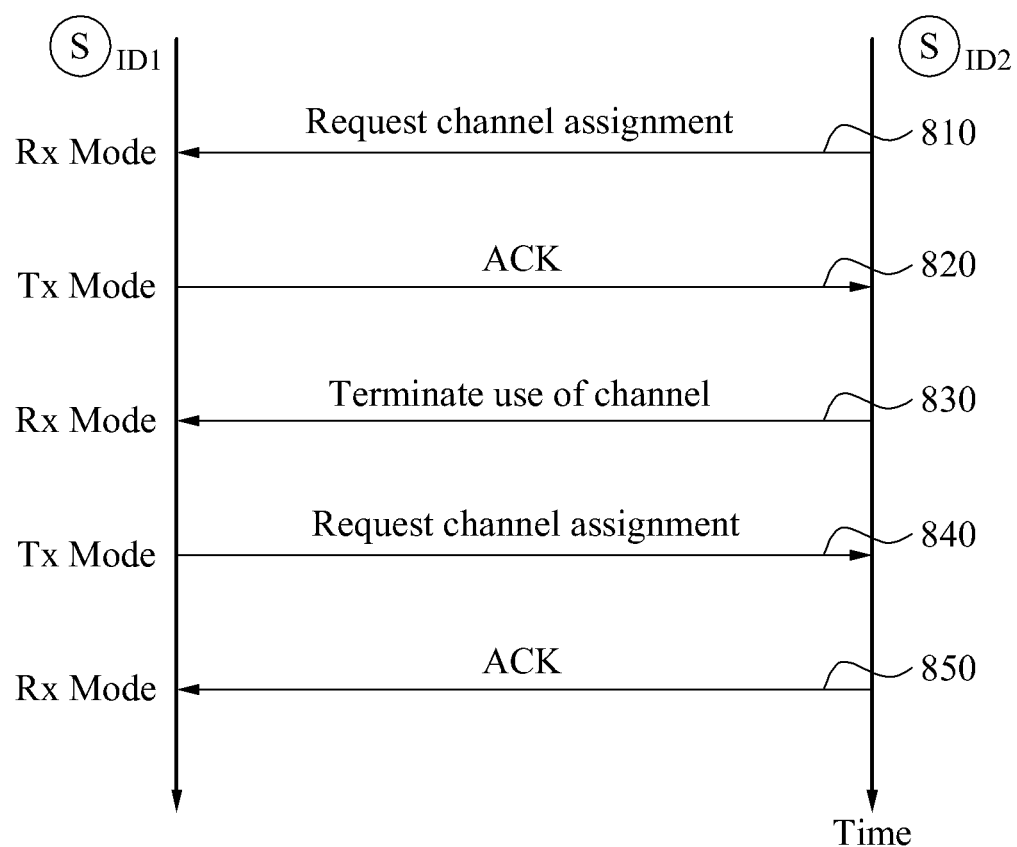
FIG. 8 is a diagram illustrating an example of a process of assigning an assigned channel to another source after an additional source terminates use of the assigned channel in a wireless power transmission system.

FIG. 8 is a diagram illustrating an example of a process of assigning an assigned channel to another source after an additional source terminates use of the assigned channel in a wireless power transmission system. Referring to FIG. 8, in 810, a source $S_{ID2}$ requests assignment of a channel occupied by a source $S_{ID1}$ while the source $S_{ID1}$ is operating in a receiving mode. In 820, the source $S_{ID1}$ transmits an acknowledgement (ACK) signal to approve the request for the channel assignment based on a state of the channel and a schedule for the source $S_{ID1}$ to use the channel. The source $S_{ID1}$ operates in a transmitting mode when it transmits the ACK signal. The source $S_{ID2}$ receives the ACK signal, and may then perform communication via an assigned channel. In 830, the source $S_{ID2}$ transmits a channel use termination message to the source $S_{ID1}$ after terminating use of the channel. In 840, the source $S_{ID1}$ requests a channel assignment from the source $S_{ID2}$ when a channel assignment is required depending on the current situation. In 850, the source $S_{ID2}$ transmits an ACK signal to approve the request for the channel assignment. The source $S_{ID1}$ receives the ACK signal, and may then perform communication with targets in a communication cell via the assigned channel.

Figure 9:
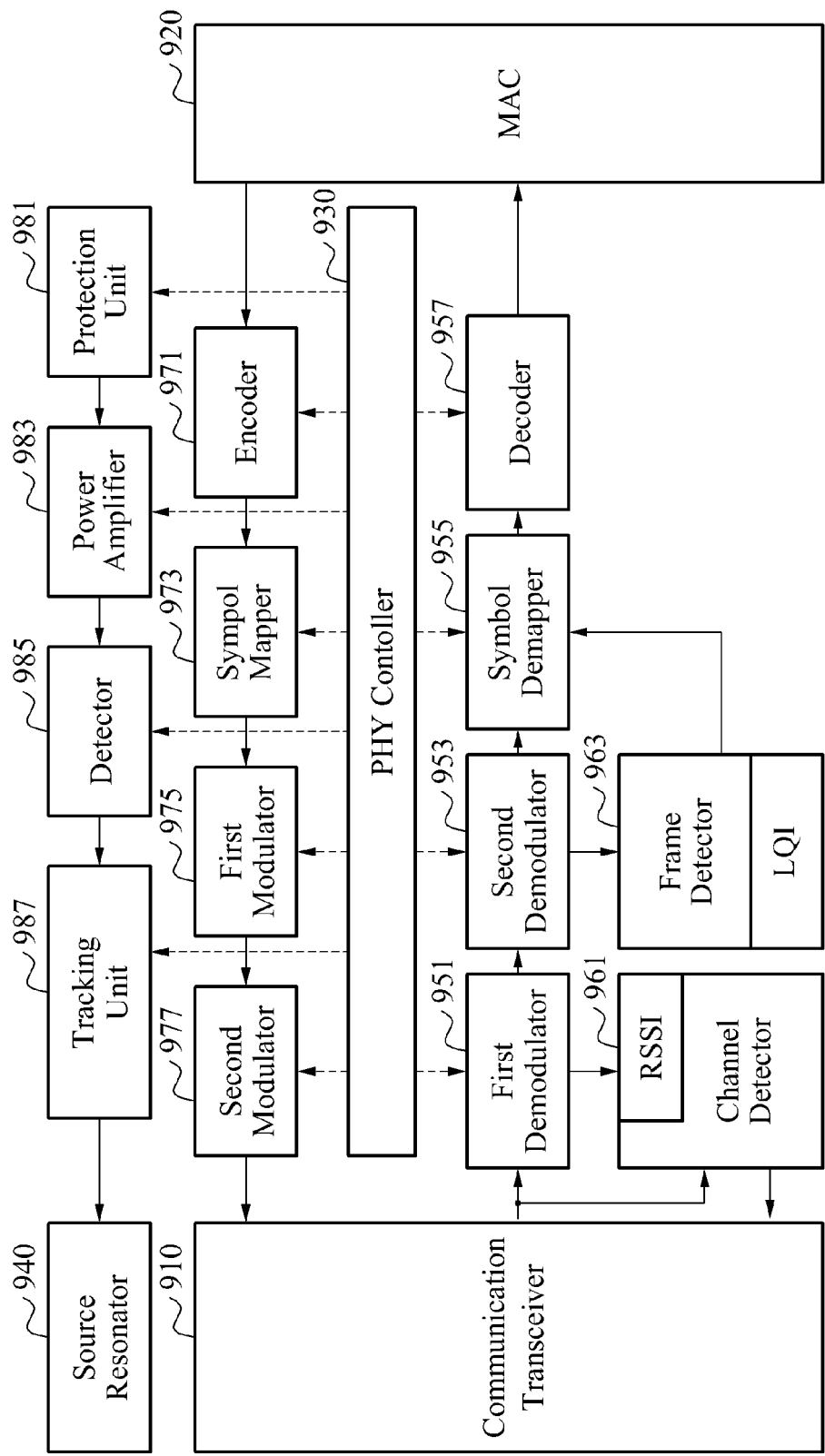
FIG. 9 is a diagram illustrating another example of a communication apparatus in a wireless power transmission system.

FIG. 9 is a diagram illustrating another example of a communication apparatus in a wireless power transmission system. Referring to FIG. 9, the communication apparatus transmits a signal modulated in a source via a communication transceiver 910 and a medium access control (MAC) 920, and receives a signal modulated in a target via the communication transceiver 910 and the medium access control (MAC) 920. The signals that are transmitted and received may be, for example, the signals shown in FIGS. 6-8. Thus, the communication apparatus of FIG. 9 performs out-of-band communication between the source and the target via the communication transceiver 910, rather than performing in-band communication through the source resonator 940. A PHY controller 930 controls an overall operation associated with modulation of data and generation of wireless power in the communication apparatus. A source resonator 940, for example a wireless power transmitter, transmits wireless power using mutual resonance with a target resonator (not shown).

A first demodulator 951, for example an offset-quadrature phase-shift keying (O-QPSK) demodulator, performs O-QPSK demodulation. A second demodulator 953, for example a chip demodulator, performs demodulation using a pseudo-random noise (PN) sequence. A symbol demapper 955 generates a data symbol corresponding to a quadrature-phase (Q) value and an in-phase (I) value. A decoder 957, for example a Viterbi decoder, decodes the data symbol using a Viterbi scheme. The decoder 957 uses a Viterbi algorithm to decode an encoded bit stream received from the symbol demapper 955 using forward error correction (FEC) based on a convolution code. Although FIG. 9 shows the decoder 957 as being part of the communication apparatus of FIG. 9, the decoder 957 may be provided as a separate element outside the communication apparatus of FIG. 9.

A channel detector 961 detects an RSSI. The RSSI is a value obtained by a measuring strength of an electric wave of data transferred by neighboring devices. A frame detector 963 detects an LQI of a communication link. The LQI is a strength between communication links, and may be calculated from the RSSI.

An encoder 971, for example a convolution encoder, encodes an input signal, and outputs the encoded signal. The encoder 971 may successfully perform bit error checking using an additional bit. Although FIG. 9 shows the encoder 971 as being part of the communication apparatus of FIG. 9, the encoder 971 may be provided as a separate element outside the communication apparatus of FIG. 9. A symbol mapper 973 performs mapping to appropriately arrange symbols based on a designated modulation scheme. A first modulator 975, for example, a direct sequence spread spectrum (DSSS) chip modulator, spreads data to a large-scale code occupying a full bandwidth of a corresponding channel by multiplying a data bit by a random bit pattern, namely a pseudo-random noise (PN) sequence. Such a scheme has a good noise prevention performance, and provides excellent security because the spread data is very difficult to recover without knowing the pseudo-random noise (PN) sequence. A second modulator 977, for example an O-QPSK modulator, performs O-QPSK modulation.

A protection unit 981 prevents an overcurrent from being supplied to a power amplifier 983. The power amplifier 983 generates power required by the target. A detector 985 detects a change in impedance of the target. Additionally, the detector 985 may detect power input to the power amplifier 983. A tracking unit 987 tracks matching impedance between the source and the target. Additionally, the tracking unit 987 may track a resonant frequency between the source and the target.

In the following description, the term "resonator" used in the discussion of FIGS. 10A through 12B refers to both a source resonator and a target resonator unless indicated otherwise.

Figure 10A:
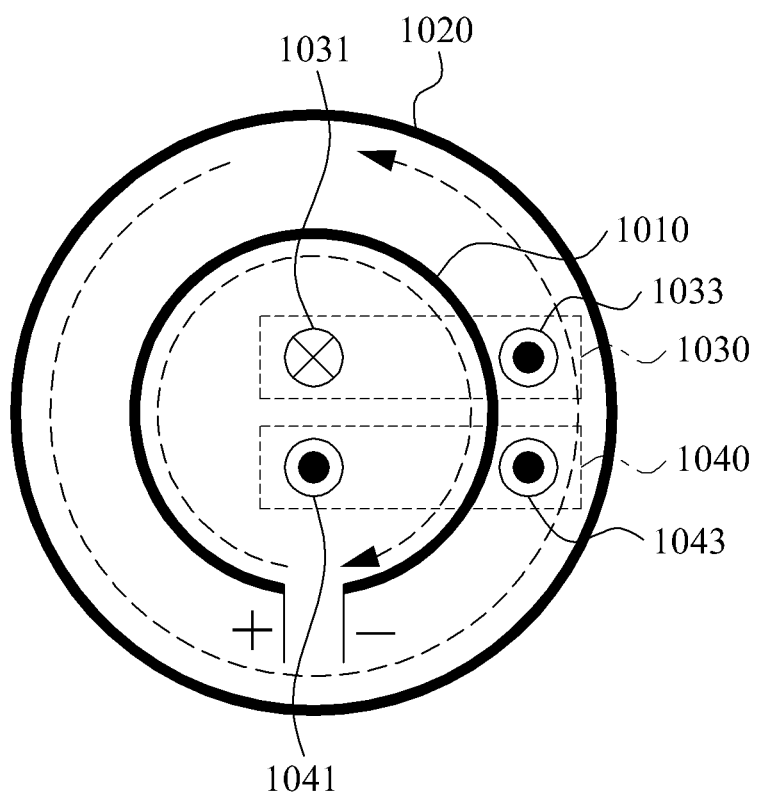
FIGS. 10A through 10B are diagrams illustrating examples of a distribution of a magnetic field in a feeder and a resonator of a wireless power transmitter.
Figure 10B:
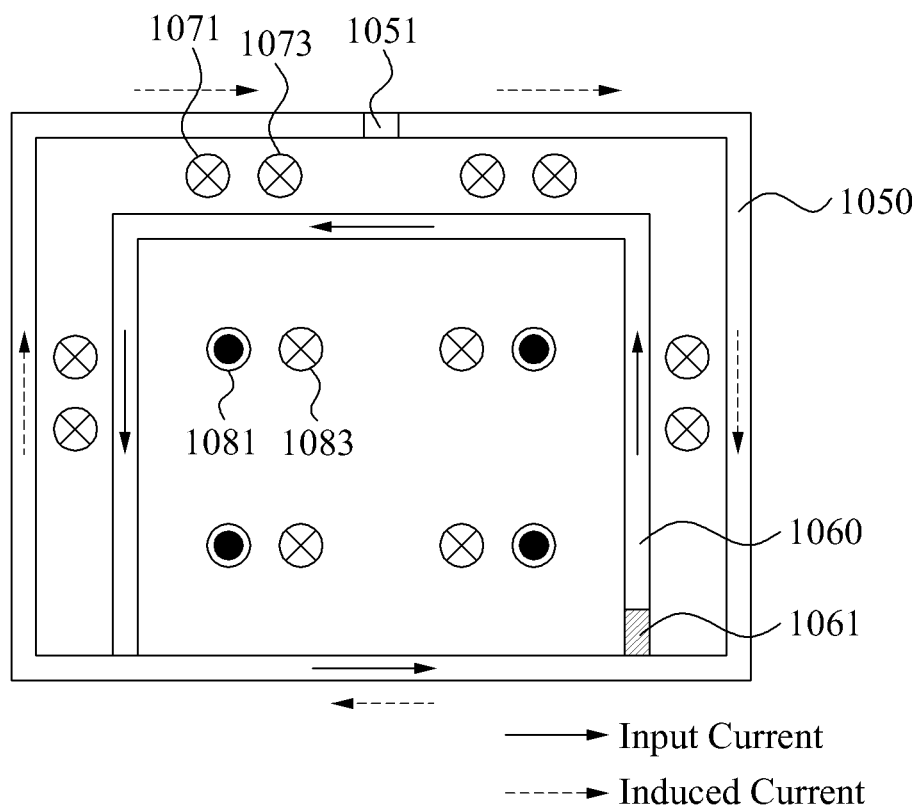

FIGS. 10A and 10B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 10A illustrates an example of a structure of a wireless power transmitter in which a feeder 1010 and a resonator 1020 do not have a common ground. Referring to FIG. 10A, as an input current flows into a feeder 1010 through a terminal labeled "+" and out of the feeder through a terminal labeled "−", a magnetic field 1030 is formed by the input current. A direction 1031 of the magnetic field 1030 inside the feeder 1010 is into the plane of FIG. 10A, and has a phase that is opposite to a phase of a direction 1033 of the magnetic field 1030 outside the feeder 1010, which is out of the plane of FIG. 10A. The magnetic field 1030 formed by the feeder 1010 induces a current to flow in a resonator 1020. The direction of the induced current in the resonator 1020 is opposite to a direction of the input current in the feeder 1010 as indicated by the dashed lines with arrowheads in FIG. 10A.

The induced current in the resonator 1020 forms a magnetic field 1040. Directions of the magnetic field 1040 are the same at all positions inside the resonator 1020, and are out of the plane of FIG. 10A. Accordingly, a direction 1041 of the magnetic field 1040 formed by the resonator 1020 inside the feeder 1010 has the same phase as a direction 1043 of the magnetic field 1040 formed by the resonator 1020 outside the feeder 1010.

Consequently, when the magnetic field 1030 formed by the feeder 1010 and the magnetic field 1040 formed by the resonator 1020 are combined, the strength of the total magnetic field inside the resonator 1020 decreases inside the feeder 1010, but increases outside the feeder 1010. In an example in which power is supplied to the resonator 1020 through the feeder 1010 configured as illustrated in FIG. 10A, the strength of the total magnetic field decreases in the center of the resonator 1020, but increases outside the resonator 1020. In another example in which a magnetic field is randomly or not uniformly distributed in the resonator 1020, it is difficult to perform impedance matching since an input impedance will frequently vary. Additionally, when the strength of the total magnetic field increases, an efficiency of wireless power transmission increases. Conversely, when the strength of the total magnetic field decreases, the efficiency of wireless power transmission decreases. Accordingly, the power transmission efficiency is reduced on average when the magnetic field is randomly or non uniformly distributed in the resonator 1020 compared to when the magnetic field is uniformly distributed in the resonator 1020.

FIG. 10B illustrates an example of a structure of a wireless power transmitter in which a resonator 1050 and a feeder 1060 have a common ground. The resonator 1050 includes a capacitor 1051. The feeder 1060 receives a radio frequency (RF) signal via a port 1061. When the RF signal is input to the feeder 1060, an input current is generated in the feeder 1060. The input current flowing in the feeder 1060 forms a magnetic field, and a current is induced in the resonator 1050 by the magnetic field. Additionally, another magnetic field is formed by the induced current flowing in the resonator 1050. In this example, a direction of the input current flowing in the feeder 1060 has a phase opposite to a phase of a direction of the induced current flowing in the resonator 1050. Accordingly, in a region between the resonator 1050 and the feeder 1060, a direction 1071 of the magnetic field formed by the input current has the same phase as a direction 1073 of the magnetic field formed by the induced current, and thus the strength of the total magnetic field increases in the region between the resonator 1050 and the feeder 1060. Conversely, inside the feeder 1060, a direction 1081 of the magnetic field formed by the input current has a phase opposite to a phase of a direction 1083 of the magnetic field formed by the induced current, and thus the strength of the total magnetic field decreases inside the feeder 1060. Therefore, the strength of the total magnetic field decreases in the center of the resonator 1050, but increases outside the resonator 1050.

An input impedance may be adjusted by adjusting an internal area of the feeder 1060. The input impedance refers to an impedance viewed in a direction from the feeder 1060 to the resonator 1050. When the internal area of the feeder 1060 is increased, the input impedance is increased. Conversely, when the internal area of the feeder 1060 is decreased, the input impedance is decreased. However, if the magnetic field is randomly or not uniformly distributed in the resonator 1050, a value of the input impedance may vary based on a location of a target device even if the internal area of the feeder 1060 has been adjusted to adjust the input impedance to match an output impedance of a power amplifier for a specific location of the target device. Accordingly, a separate matching network may be required to match the input impedance to the output impedance of a power amplifier. For example, when the input impedance is increased, a separate matching network may be used to match the increased input impedance to a relatively low output impedance of the power amplifier.

Figure 11A:
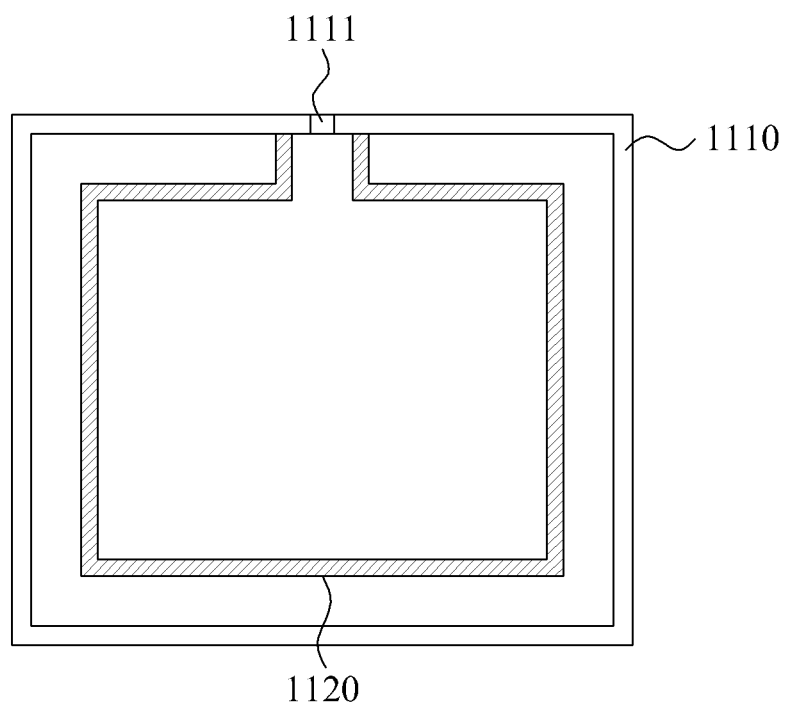
FIGS. 11A and 11B are diagrams illustrating an example of a wireless power transmitter including a resonator and a feeding unit.
Figure 11B:
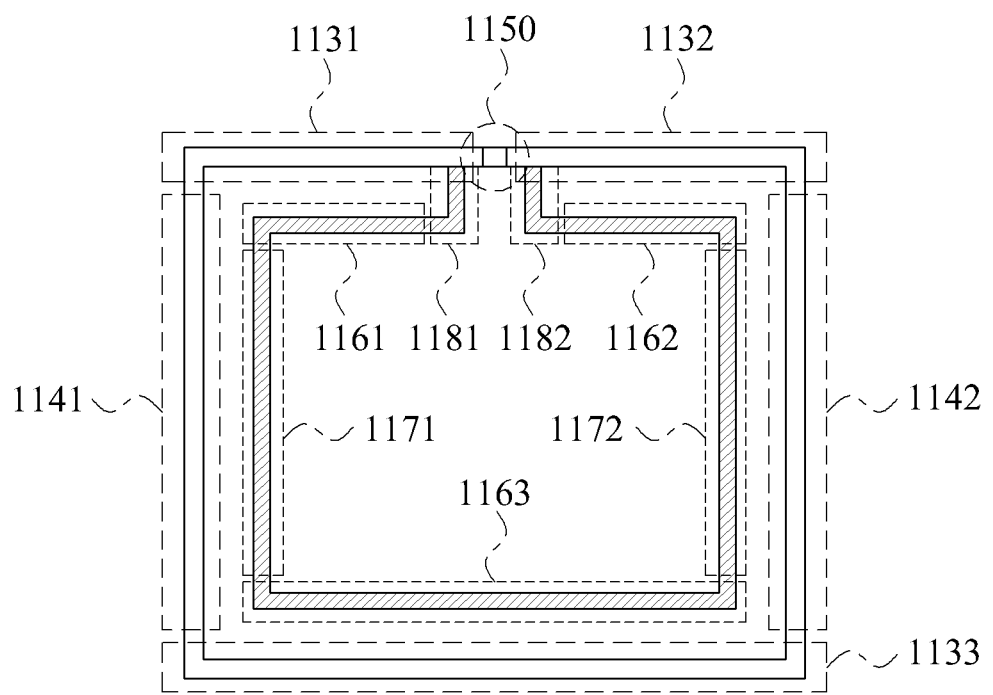

FIGS. 11A and 11B are diagrams illustrating an example of a wireless power transmitter including a resonator and a feeding unit. Referring to FIG. 11A, the wireless power transmitter includes a resonator 1110 and a feeding unit 1120. The resonator 1110 includes a capacitor 1111. The feeding unit 1120 is electrically connected to both ends of the capacitor 1111.

FIG. 11B is a diagram illustrating in greater detail a structure of the wireless power transmitter of FIG. 11A. The resonator 1110 includes a first transmission line (not identified by a reference numeral in FIG. 11B, but formed by various elements in FIG. 11B as discussed below), a first conductor 1141, a second conductor 1142, and at least one capacitor 1150.

The capacitor 1150 is inserted in series between a first signal conducting portion 1131 and a second signal conducting portion 1132, causing an electric field to be concentrated in the capacitor 1150. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 11B is separated into two portions that will be referred to as the first signal conducting portion 1131 and the second signal conducting portion 1132. A conductor disposed in a lower portion of the first transmission line in FIG. 11B will be referred to as a first ground conducting portion 1133.

As illustrated in FIG. 11B, the resonator 1110 has a generally two-dimensional (2D) structure. The first transmission line includes the first signal conducting portion 1131 and the second signal conducting portion 1132 in the upper portion of the first transmission line, and includes the first ground conducting portion 1133 in the lower portion of the first transmission line. The first signal conducting portion 1131 and the second signal conducting portion 1132 are disposed to face the first ground conducting portion 1133. A current flows through the first signal conducting portion 1131 and the second signal conducting portion 1132.

One end of the first signal conducting portion 1131 is connected to one end the first conductor 1141, the other end of the first signal conducting portion 1131 is connected to one end of the capacitor 1150, and the other end of the first conductor 1141 is connected to one end of the first ground conducting portion 1133. One end of the second signal conducting portion 1132 is connected to one end of the second conductor 1142, the other end of the second signal conducting portion 1132 is connected to the other end of the capacitor 1150, and the other end of the second conductor 1142 is connected to the other end of the first ground conducting portion 1133. Accordingly, the first signal conducting portion 1131, the second signal conducting portion 1132, the first ground conducting portion 1133, the first conductor 1141, and the second conductor 1142 are connected to each other, causing the resonator 1110 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1150 is inserted into an intermediate portion of the first transmission line. In the example in FIG. 11B, the capacitor 1150 is inserted into a space between the first signal conducting portion 1131 and the second signal conducting portion 1132. The capacitor 1150 may be a lumped element capacitor, a distributed element capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1150 inserted into the first transmission line may cause the resonator 1110 to have a characteristic of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial having a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 1150 is a lumped element capacitor and a capacitance of the capacitor 1150 is appropriately determined, the resonator 1110 may have a characteristic of a metamaterial. If the resonator 1110 is caused to have a negative magnetic permeability by appropriately adjusting the capacitance of the capacitor 1150, the resonator 1110 may also be referred to as an MNG resonator. Various criteria may be applied to determine the capacitance of the capacitor 1150. For example, the various criteria may include a criterion for enabling the resonator 1110 to have the characteristic of the metamaterial, a criterion for enabling the resonator 1110 to have a negative magnetic permeability at a target frequency, a criterion for enabling the resonator 1110 to have a zeroth order resonance characteristic at the target frequency, and any other suitable criterion. Based on any one or any combination of the aforementioned criteria, the capacitance of the capacitor 1150 may be appropriately determined.

The resonator 1110, hereinafter referred to as the MNG resonator 1110, may have a zeroth order resonance characteristic of having a resonant frequency when a propagation constant is "0". If the resonator 1110 has the zeroth order resonance characteristic, the resonant frequency is independent of a physical size of the MNG resonator 1110. By changing the capacitance of the capacitor 1150, the resonant frequency of the MNG resonator 1110 may be changed without changing the physical size of the MNG resonator 1110.

In a near field, the electric field is concentrated in the capacitor 1150 inserted into the first transmission line, causing the magnetic field to become dominant in the near field. The MNG resonator 1110 has a relatively high Q-factor when the capacitor 1150 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 11B, a magnetic core passing through the MNG resonator 1110 may be provided to increase a power transmission distance.

Referring to FIG. 11B, the feeding unit 1120 includes a second transmission line (not identified by a reference numeral in FIG. 11B, but formed by various elements in FIG. 11B as discussed below), a third conductor 1171, a fourth conductor 1172, a fifth conductor 1181, and a sixth conductor 1182.

The second transmission line includes a third signal conducting portion 1161 and a fourth signal conducting portion 1162 in an upper portion of the second transmission line, and includes a second ground conducting portion 1163 in a lower portion of the second transmission line. The third signal conducting portion 1161 and the fourth signal conducting portion 1162 are disposed to face the second ground conducting portion 1163. A current flows through the third signal conducting portion 1161 and the fourth signal conducting portion 1162.

One end of the third signal conducting portion 1161 is connected to one end of the third conductor 1171, the other end of the third signal conducting portion 1161 is connected to one end of the fifth conductor 1181, and the other end of the third conductor 1171 is connected to the one end of the second ground conducting portion 1163. One end of the fourth signal conducting portion 1162 is connected to one end of the fourth conductor 1172, the other end of the fourth signal conducting portion 1162 is connected to one end of the sixth conductor 1182, and the other end of the fourth conductor 1172 is connected to the other end of the second ground conducting portion 1163. The other end of the fifth conductor 1181 is connected to the first signal conducting portion 1131 at or near where the first signal conducting portion 1131 is connected to one end of the capacitor 1150, and the other end of the sixth conductor 1182 is connected to the second signal conducting portion 1132 at or near where the second signal conducting portion 1132 is connected to the other end of the capacitor 1150. Thus, the fifth conductor 1181 and the sixth conductor 1182 are connected in parallel to both ends of the capacitor 1150. The fifth conductor 1181 and the sixth conductor 1182 may be used as an input port to receive an RF signal as an input.

Accordingly, the third signal conducting portion 1161, the fourth signal conducting portion 1162, the second ground conducting portion 1163, the third conductor 1171, the fourth conductor 1172, the fifth conductor 1181, the sixth conductor 1182, and the resonator 1110 are connected to each other, causing the resonator 1110 and the feeding unit 1120 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 1181 or the sixth conductor 1182, input current flows through the feeding unit 1120 and the resonator 1110, generating a magnetic field that induces a current in the resonator 1110. A direction of the input current flowing through the feeding unit 1120 is identical to a direction of the induced current flowing through the resonator 1110, thereby causing the strength of the total magnetic field to increase in the center of the resonator 1110, and decrease near the outer periphery of the resonator 1110.

An input impedance is determined by an area of a region between the resonator 1110 and the feeding unit 1120. Accordingly, a separate matching network used to match the input impedance to an output impedance of a power amplifier may not be necessary. However, if a matching network is used, the input impedance may be adjusted by adjusting a size of the feeding unit 1120, and accordingly a structure of the matching network may be simplified. The simplified structure of the matching network reduces a matching loss of the matching network.

The second transmission line, the third conductor 1171, the fourth conductor 1172, the fifth conductor 1181, and the sixth conductor 1182 of the feeding unit 1120 may have a structure identical to a structure of the resonator 1110. For example, if the resonator 1110 has a loop structure, the feeding unit 1120 may also have a loop structure. As another example, if the resonator 1110 has a circular structure, the feeding unit 1120 may also have a circular structure.

Figure 12A:
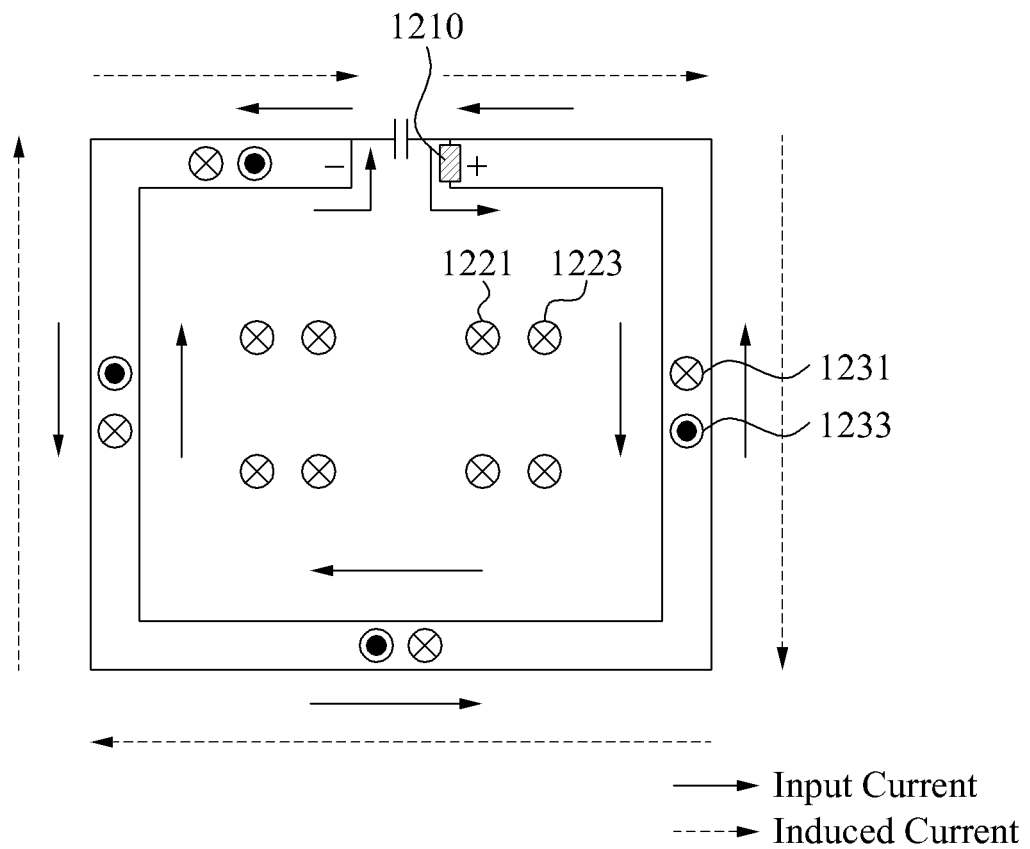
FIG. 12A is a diagram illustrating an example of a distribution of a magnetic field inside a resonator produced by feeding of a feeding unit.

FIG. 12A is a diagram illustrating an example of a distribution of a magnetic field inside a resonator produced by feeding of a feeding unit. FIG. 12A more simply illustrates the resonator 1110 and the feeding unit 1120 of FIGS. 11A and 11B, and the names of the various elements in FIG. 11B will be used in the following description of FIG. 12A without reference numerals.

A feeding operation may be an operation of supplying power to a source resonator in wireless power transmission, or an operation of supplying AC power to a rectification unit in wireless power transmission. FIG. 12A illustrates a direction of an input current flowing in the feeding unit, and a direction of an induced current flowing in the source resonator. Additionally, FIG. 12A illustrates a direction of a magnetic field formed by the input current of the feeding unit, and a direction of a magnetic field formed by the induced current of the source resonator.

Referring to FIG. 12A, the fifth conductor or the sixth conductor of the feeding unit may be used as an input port 1210. In FIG. 12A, the sixth conductor of the feeding unit is being used as the input port 1210. An RF signal is input to the input port 1210. The RF signal may be output from a power amplifier. The power amplifier may increase and decrease an amplitude of the RF signal based on a power requirement of a target device. The RF signal input to the input port 1210 is represented in FIG. 12A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 12A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 12A, inside the feeding unit, a direction 1221 of the magnetic field generated by the input current flowing in the feeding unit is identical to a direction 1223 of the magnetic field formed generated by the induced current flowing in the resonator. Accordingly, the strength of the total magnetic field increases inside the feeding unit.

In contrast, as illustrated in FIG. 12A, in a region between the feeding unit and the resonator, a direction 1233 of the magnetic field generated by the input current flowing in the feeding unit is opposite to a direction 1231 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 12A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 12B:
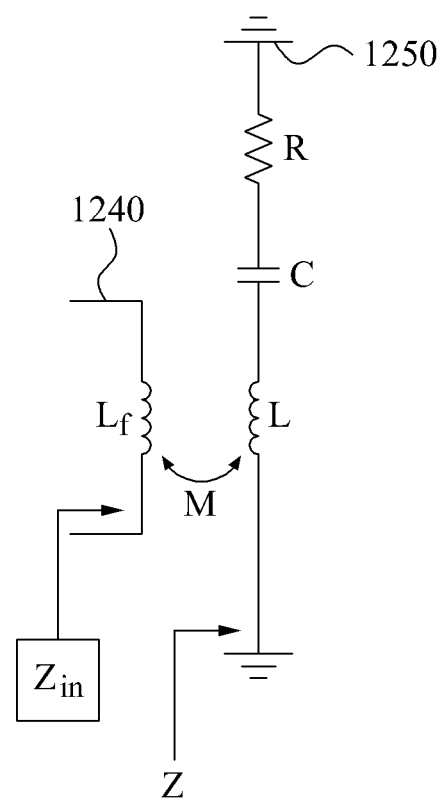
FIG. 12B is a diagram illustrating examples of equivalent circuits of a feeding unit and a resonator.

FIG. 12B is a diagram illustrating examples of equivalent circuits of a feeding unit and a resonator. Referring to FIG. 12B, a feeding unit 1240 and a resonator 1250 may be represented by the equivalent circuits in FIG. 12B. The feeding unit 1240 is represented as an inductor having an inductance $L_f$, and the resonator 1250 is represented as a series connection of an inductor having an inductance L coupled to the inductance $L_f$ of the feeding unit 1240 by a mutual inductance M, a capacitor having a capacitance C, and a resistor having a resistance R. An example of an input impedance $Z_{in}$ viewed in a direction from the feeding unit 1240 to the resonator 1250 may be expressed by the following Equation 4:

$$Z_{in} = \frac{(\omega M)^2}{Z} \quad (4)$$

In Equation 4, M denotes a mutual inductance between the feeding unit 1240 and the resonator 1250, ω denotes a resonant frequency of the feeding unit 1240 and the resonator 1250, and Z denotes an impedance viewed in a direction from the resonator 1250 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1240 and the resonator 1250. The area of the region between the feeding unit 1240 and the resonator 1250 may be adjusted by adjusting a size of the feeding unit 1240, thereby adjusting the mutual inductance M and the input impedance $Z_{in}$. Since the input impedance $Z_{in}$ may be adjusted by adjusting the size of the feeding unit 1240, it may be unnecessary to use a separate matching network to perform impedance matching with an output impedance of a power amplifier.

In a target resonator and a feeding unit included in a wireless power receiver, a magnetic field may be distributed as illustrated in FIG. 12A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 12A, a direction of the induced current flowing in the target resonator will be identical to a direction of the induced current flowing in the feeding unit. Accordingly, for the reasons discussed above in connection with FIG. 12A, the strength of the total magnetic field will increase inside the feeding unit, and will decrease in a region between the feeding unit and the target resonator.

Figure 13:
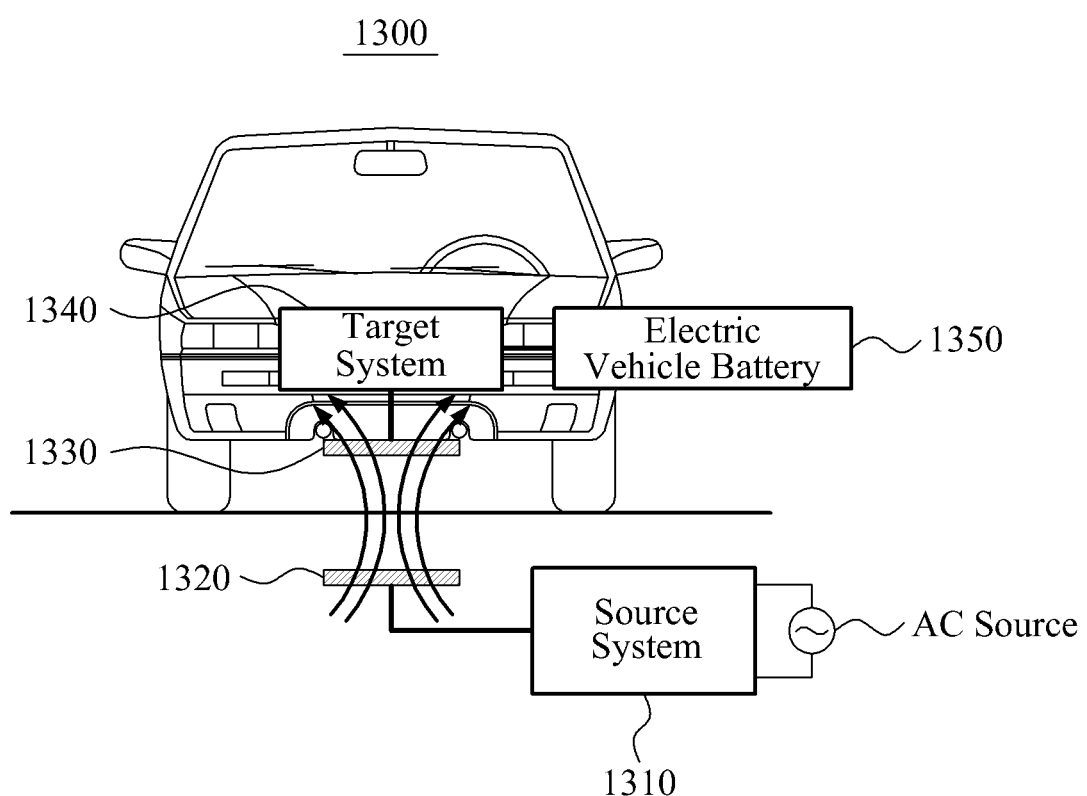
FIG. 13 is a diagram illustrating an example of an electric vehicle charging system.

FIG. 13 is a diagram illustrating an example of an electric vehicle charging system. Referring to FIG. 13, an electric vehicle charging system 1300 includes a source system 1310, a source resonator 1320, a target resonator 1330, a target system 1340, and an electric vehicle battery 1350.

In one example, the electric vehicle charging system 1300 has a structure similar to the structure of the wireless power transmission system and charging system of FIG. 1. The source system 1310 and the source resonator 1320 in the electric vehicle charging system 1300 operate as a source. The target resonator 1330 and the target system 1340 in the electric vehicle charging system 1300 operate as a target.

In one example, the source system 1310 includes an alternating current-to-direct current (AC/DC) converter, a power detector, a power converter, a control and communication (control/communication) unit similar to those of the source device 110 of FIG. 1. In one example, the target system 1340 includes a rectification unit, a DC-to-DC (DC/DC) converter, a switch unit, a charging unit, and a control/communication unit similar to those of the target device 120 of FIG. 1. The electric vehicle battery 1350 is charged by the target system 1340. The electric vehicle charging system 1300 may use a resonant frequency in a band of a few kHz to tens of MHz.

The source system 1310 generates power based on a type of the vehicle being charged, a capacity of the electric vehicle battery 1350, and a charging state of the electric vehicle battery 1350, and wirelessly transmits the generated power to the target system 1340 via a magnetic coupling between the source resonator 1320 and the target resonator 1330.

The source system 1310 may control an alignment of the source resonator 1320 and the target resonator 1330. For example, when the source resonator 1320 and the target resonator 1330 are not aligned, the controller of the source system 1310 may transmit a message to the target system 1340 to control the alignment of the source resonator 1320 and the target resonator 1330.

For example, when the target resonator 1330 is not located in a position enabling maximum magnetic coupling, the source resonator 1320 and the target resonator 1330 are not properly aligned. When a vehicle does not stop at a proper position to accurately align the source resonator 1320 and the target resonator 1330, the source system 1310 may instruct a position of the vehicle to be adjusted to control the source resonator 1320 and the target resonator 1330 to be aligned. However, this is just an example, and other methods of aligning the source resonator 1320 and the target resonator 1330 may be used.

The source system 1310 and the target system 1340 may transmit or receive an ID of a vehicle and exchange various messages by performing communication with each other.

The descriptions of FIGS. 2A through 12B are also applicable to the electric vehicle charging system 1300. However, the electric vehicle charging system 1300 may use a resonant frequency in a band of a few kHz to tens of MHz, and may wirelessly transmit power that is equal to or higher than tens of watts to charge the electric vehicle battery 1350.

The control/communication unit 115, the control/communication unit 126, the operating mode converter 310, the measuring unit 320, the determining unit 330, the controller 340, the transmitting unit 350, the receiving unit 360, the state information detector 410, the identifying unit 420, the determining unit 430, the controller 440, the transmitting unit 450, the receiving unit 460, the communication transceiver 910, the MAC 920, the PHY controller 930, the first demodulator 951, the second demodulator 953, the symbol demapper 955, the decoder 957, the channel detector 961, the frame detector 963, the encoder 971, the symbol mapper 973, the first modulator 975, and second modulator 977, the protection unit 981, the power amplifier 983, the detector 985, the tracking unit 987, the source system 1310, and the target system 1340 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, frequency synthesizers, LO generators, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the following claims and their equivalents are to be construed as being included in the disclosure.

What is claimed is:

1. A communication apparatus in a wireless power transmission system, the communication apparatus comprising:

a controller configured to switch an operating mode of the communication apparatus between a transmitting mode and a receiving mode according to a predetermined timing; and a transmitter configured to transmit state information of a communication channel occupied by a source comprising the communication apparatus using a continuous wave signal while the communication apparatus is operating in the transmitting mode irrespective of whether the communication apparatus is performing communication via the occupied communication channel, the source comprising the communication apparatus being configured to transmit wireless power, the occupied communication channel having been assigned to the source comprising the communication apparatus from a plurality of communication channels available in a communication cell for assignment to a plurality of sources each configured to transmit wireless power.

2. The communication apparatus of claim 1, further comprising a receiver configured to receive a channel assignment request message from an additional source in the communication cell while the communication apparatus is operating in the receiving mode, the additional source having entered the communication cell after all of the communication channels have already been assigned to other sources.

3. The communication apparatus of claim 2, wherein the controller is further configured to determine whether the occupied communication channel is to be assigned to the additional source based on the state information of the occupied communication channel and a schedule of the source comprising the communication apparatus for using the occupied communication channel in response to the channel assignment request message.

4. The communication apparatus of claim 3, wherein the transmitter is further configured to transmit a channel assignment approval message to the additional source in the transmitting mode when the determining unit determines that the occupied communication channel is to be assigned to the additional source.

5. The communication apparatus of claim 3, wherein the controller is further configured to measure a received signal strength indicator (RSSI) and a link quality indicator (LQI) of the occupied communication channel while the communication apparatus is operating in the receiving mode.

6. The communication apparatus of claim 5, wherein the controller is further configured to determine whether the occupied communication channel is to be changed to another communication channel based on the RSSI and the LQI of the occupied communication channel.

7. The communication apparatus of claim 2, wherein the receiver is further configured to receive a channel assignment request message from any of the plurality of sources in the communication cell excluding the source comprising the communication apparatus while the communication apparatus is operating in the receiving mode.

8. The communication apparatus of claim 1, wherein the state information of the occupied communication channel comprises information about the source comprising the communication apparatus that is currently occupying the communication channel, information about a target receiving wireless power from the source comprising the communication apparatus, and information about a schedule the source comprising the communication apparatus for using the communication channel.

9. A communication method in a wireless power transmission system, the communication method comprising:

switching an operating mode of a communication apparatus performing the communication method between a transmitting mode and a receiving mode according to a predetermined timing; and transmitting state information of a communication channel occupied by a source comprising the communication apparatus using a continuous wave signal while the communication apparatus is operating in the transmitting mode irrespective of whether the communication apparatus is performing communication via the occupied communication channel, the source comprising the communication apparatus being configured to transmit wireless power, the occupied communication channel having been assigned to the source comprising the communication apparatus from a plurality of communication channels available in a communication cell for assignment to a plurality of sources each configured to transmit wireless power.

10. The communication method of claim 9, further comprising receiving a channel assignment request message from an additional source in the communication cell while the communication apparatus is operating in the receiving mode, the additional source having entered the communication cell after all of the communication channels have already been assigned to other sources.

11. The communication method of claim 10, further comprising determining whether the occupied communication channel is to be assigned to the additional source based on the state information of the occupied communication channel and a schedule of the source comprising the communication apparatus for using the occupied communication channel in response to the channel assignment request message.

12. The communication method of claim 11, further comprising transmitting a channel assignment approval message to the additional source in the transmitting mode when a result of the determining is that the occupied communication channel is to be assigned to the additional source.

* * * * *